United States Patent
Kumagai

(10) Patent No.: US 12,518,613 B2
(45) Date of Patent: Jan. 6, 2026

(54) IN-VEHICLE MONITORING DEVICE, IN-VEHICLE MONITORING SYSTEM, AND IN-VEHICLE MONITORING METHOD

(71) Applicant: Mitsubishi Electric Corporation, Tokyo (JP)

(72) Inventor: Taro Kumagai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 403 days.

(21) Appl. No.: 18/022,339

(22) PCT Filed: Oct. 30, 2020

(86) PCT No.: PCT/JP2020/040801
§ 371 (c)(1),
(2) Date: Feb. 21, 2023

(87) PCT Pub. No.: WO2022/091338
PCT Pub. Date: May 5, 2022

(65) Prior Publication Data
US 2023/0326324 A1    Oct. 12, 2023

(51) Int. Cl.
| | |
|---|---|
| *G08B 21/24* | (2006.01) |
| *G01S 13/08* | (2006.01) |
| *G06V 20/59* | (2022.01) |
| *G08B 7/06* | (2006.01) |
| *G08B 21/14* | (2006.01) |
| *G08B 21/22* | (2006.01) |

(52) U.S. Cl.
CPC .............. *G08B 21/24* (2013.01); *G01S 13/08* (2013.01); *G06V 20/59* (2022.01); *G08B 7/06* (2013.01); *G08B 21/14* (2013.01); *G08B 21/22* (2013.01)

(58) Field of Classification Search
CPC ........ G01S 13/08; G06V 20/59; G08B 21/14; G08B 21/22; G08B 21/24; G08B 7/06
See application file for complete search history.

(56) References Cited

U.S. PATENT DOCUMENTS

2009/0043449 A1* 2/2009 Matsuura ............ G07C 5/085
                                                     348/148
2019/0251376 A1* 8/2019 Stoffel ................ B60Q 3/76

FOREIGN PATENT DOCUMENTS

| EP | 3819171 A1 * | 5/2021 | ............ B60N 2/002 |
|---|---|---|---|
| JP | 2017-7453 A | 1/2017 | |
| JP | WO2020/008568 A1 | 1/2020 | |

* cited by examiner

*Primary Examiner* — Omer S Khan
(74) *Attorney, Agent, or Firm* — Birch, Stewart, Kolasch & Birch, LLP

(57) ABSTRACT

An in-vehicle monitoring device includes: an in-vehicle information acquisition unit to acquire in-vehicle information; an occupant detection unit and a notification object detection unit to detect an occupant in a vehicle and a notification object in the vehicle, respectively, using the in-vehicle information; a first ride determination unit to determine whether ride of the occupant or the notification object in the vehicle is a first ride; a left-behind determination unit to determine whether the notification object is left behind; and a notification control unit to determine that notification is necessary when a first condition is satisfied in a case where it is determined that the notification object is left behind. In a case where the ride is a first ride, the notification control unit determines necessity of notification using a second condition relaxed as compared with the first condition in a case where the ride is not a first ride.

19 Claims, 10 Drawing Sheets

FIG. 11

| | Elapsed Time | Environment Information | Notification Method |
|---|---|---|---|
| Allowable Range | Outside First Time Allowable Range and Within Second Time Allowable Range | Outside First Environmental Allowable Range and Within Second Environmental Allowable Range | First Notification |
| | Outside First Time Allowable Range and Within Second Time Allowable Range | Outside Second Environmental Allowable Range | Second Notification |
| | Outside Second Time Allowable Range | Outside First Environmental Allowable Range and Within Second Environmental Allowable Range | Second Notification |
| | Outside Second Time Allowable Range | Outside Second Environmental Allowable Range | First Notification + Second Notification |

IN-VEHICLE MONITORING DEVICE, IN-VEHICLE MONITORING SYSTEM, AND IN-VEHICLE MONITORING METHOD

TECHNICAL FIELD

The present disclosure relates to an in-vehicle monitoring device and an in-vehicle monitoring system.

BACKGROUND ART

There has been proposed a technique of detecting a notification object such as a child or a pet that cannot go out of a vehicle by itself when the notification object is left behind in a vehicle such as an automobile, and notifying that the notification object is left behind in the vehicle. Conventionally, notification has been performed in a case where a notification object such as a child is detected in a vehicle after a predetermined time has elapsed since a driver leaves the vehicle, for example, by going out of the vehicle (see, for example, Patent Literature 1).

CITATION LIST

Patent Literature

Patent Literature 1: JP 2017-7453 A

SUMMARY OF INVENTION

Technical Problem

In a case where there is a child who needs to be seated on a child safety seat, a driver who is a parent or an occupant who is a passenger allows the child to be seated on the child safety seat, and then gets in the vehicle and sits on a seat, and therefore the child that is a notification object temporarily rides in the vehicle alone. However, in a case where a condition regarding necessity of notification is set without considering some use cases, and even in a case where a notification object temporarily rides in a vehicle alone unavoidably as in the above situation, it is determined that the notification object is left behind and notification is performed, which does seem a little troublesome sometimes for an occupant who does not intend to leave the notification object behind.

The present disclosure has been made in order to solve the above-described problem, and an object of the present disclosure is to provide an in-vehicle monitoring device capable of eliminating annoyance and stress due to notification in a case where a notification object temporarily rides in a vehicle alone unavoidably.

Solution to Problem

An in-vehicle monitoring device according to the present disclosure includes: processing circuitry to acquire in-vehicle information indicating a situation in a vehicle from a sensor that detects an object in the vehicle, to detect an occupant in the vehicle using the acquired in-vehicle information, to detect a notification object in the vehicle using the acquired in-vehicle information, to determine whether ride of the occupant or the notification object in the vehicle is a first ride, to determine whether the notification object is left behind in the vehicle using detection results, and to determine that notification is necessary if a set first condition is satisfied in a case where processing circuitry determines that the notification object is left behind. In a case where the processing circuitry determines that the ride is a first ride, the processing circuitry determines necessity of notification using a second condition relaxed as compared with the first condition in a case where the processing circuitry determines that the ride is not a first ride.

An in-vehicle monitoring system according to the present disclosure includes: a sensor mounted on a vehicle and adapted to detect an object in the vehicle; and processing circuitry to acquire in-vehicle information indicating a situation in the vehicle from the sensor, to detect an occupant in the vehicle using the acquired in-vehicle information, to detect a notification object in the vehicle using the acquired in-vehicle, to determine whether ride of the occupant or the notification object in the vehicle is a first ride, to determine whether the notification object is left behind in the vehicle using detection results, and to determine that notification is necessary if a set first condition is satisfied in a case where the processing circuitry determines that the notification object is left behind. In a case where the processing circuitry determines that the ride is a first ride, the processing circuitry determines necessity of notification using a second condition relaxed as compared with the first condition in a case where the processing circuitry determines that the ride is not a first ride.

An in-vehicle monitoring method according to the present disclosure includes: acquiring in-vehicle information indicating a situation in a vehicle from a sensor that detects an object in the vehicle; detecting an occupant in the vehicle using the acquired in-vehicle information; detecting a notification object in the vehicle using the acquired in-vehicle information; determining whether ride of the occupant or the notification object in the vehicle is a first ride; determining whether the notification object is left behind in the vehicle using detection results; determining that notification is necessary if a set first condition is satisfied in a case where it is determined that the notification object is left behind, and in a case where it is determined that the ride is a first ride, determining that notification is necessary using a second condition relaxed as compared with the first condition in a case where it is determined that the ride is not a first ride.

Advantageous Effects of Invention

According to the present disclosure, it is possible to notify that a notification object is left behind in a vehicle, and to eliminate annoyance and stress due to notification in a case where the notification object temporarily rides in the vehicle alone unavoidably.

BRIEF DESCRIPTION OF DRAWINGS

FIG. 11 is an explanatory diagram illustrating an operation example of a notification control unit according to the third embodiment.

DESCRIPTION OF EMBODIMENTS

Hereinafter, embodiments will be described with reference to the drawings. For the sake of explanation, a driver, a passenger, and the like who can go out of a vehicle (hereinafter, referred to as "outside of vehicle") by themselves even when they are left behind in the vehicle (hereinafter, referred to as "inside of vehicle") are referred to as occupants, and children including infants, pets, and the like that have difficulty in going out of the vehicle by themselves when they are left behind in the vehicle are referred to as notification objects. Note that the in-vehicle monitoring device and the in-vehicle monitoring system do not distinguish between a case where a notification object temporarily rides in a vehicle alone unavoidably and a case where the notification object is left behind in the vehicle, and therefore in the present disclosure, hereinafter, the notification object left alone in the vehicle may be referred to as the notification object left behind in the vehicle for the sake of explanation. In addition, the presence of the notification object alone in the vehicle includes presence of a plurality of notification objects without presence of an occupant in the vehicle.

First Embodiment

Figure 1:
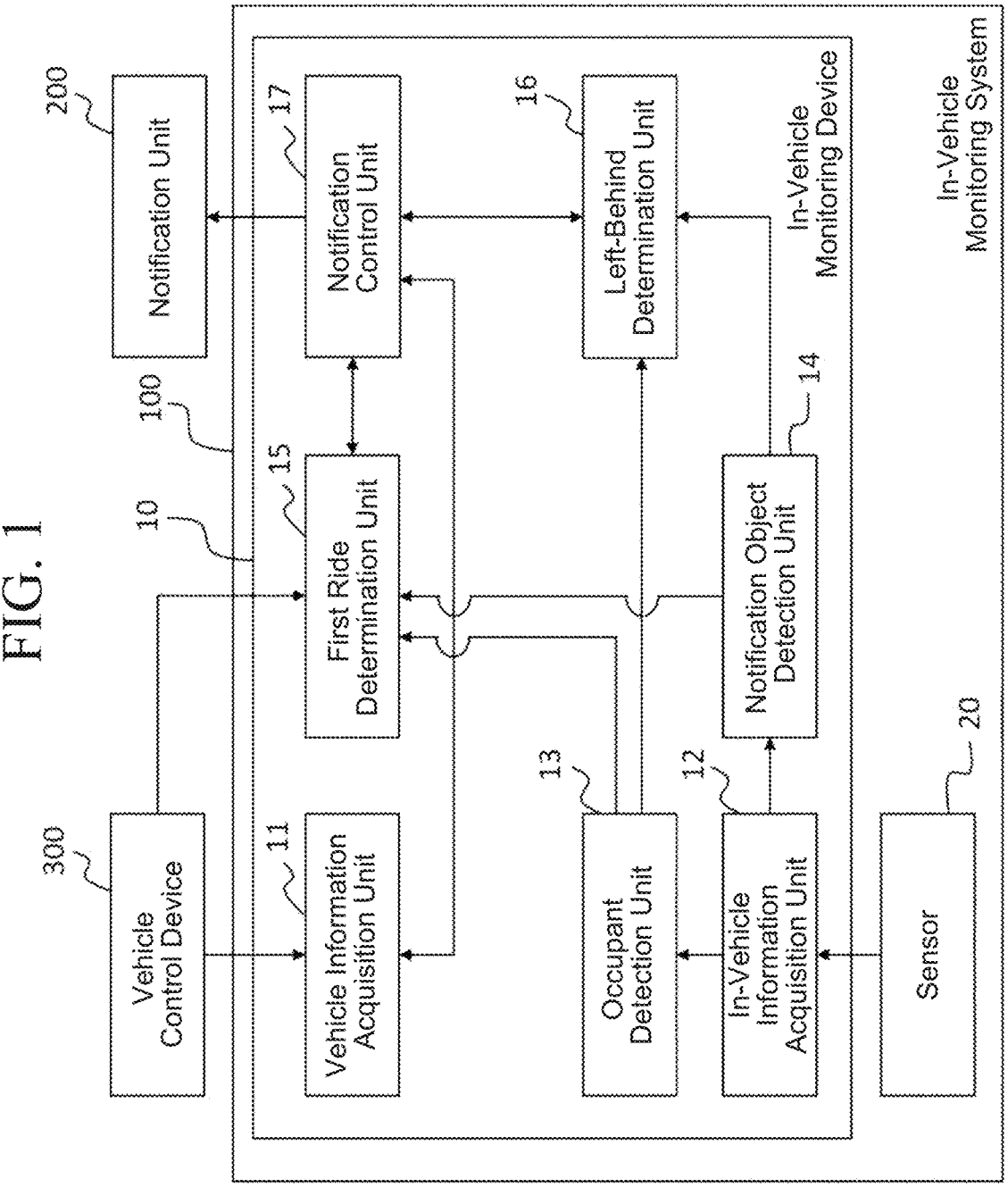
FIG. 1 is a block diagram illustrating a configuration example of an in-vehicle monitoring system according to a first embodiment.

FIG. 1 is a block diagram illustrating a configuration example of an in-vehicle monitoring system 100 according to a first embodiment. The in-vehicle monitoring system 100 includes an in-vehicle monitoring device 10 and a sensor 20, and the in-vehicle monitoring device 10 and the sensor 20 are each mounted on a vehicle 1.

The sensor 20 is a sensor that is mounted on the vehicle 1 and detects an object in the vehicle. The in-vehicle monitoring device 10 detects an occupant 2 in the vehicle and a notification object 3 in the vehicle using the sensor 20. Examples of the sensor 20 that detects an object in the vehicle include an imaging device (a visible light camera or a camera having a specific electromagnetic wave filter), an elektrokardiogramm (EKG) sensor or an electrocardiogram (ECG) sensor, a photoplethysmography sensing, an electroencephalogram (EEG) measuring instrument, a spirometer, a respiratory activity measuring instrument, a time-of-flight (TOF) sensor, a radio wave sensor, a millimeter wave radar, a pulse oximeter, a thermographer, a thermal imager, an infrared imager, a detector for movement of facial muscles, a skin temperature conductance sensor, a skin resistance sensor, a sweat amount sensor, a near-infrared spectrometer, a computed tomography (CT) instrument, a weight sensor, and a voice sensor. The sensor 20 is any one of these or a combination of some of these.

Figure 2:
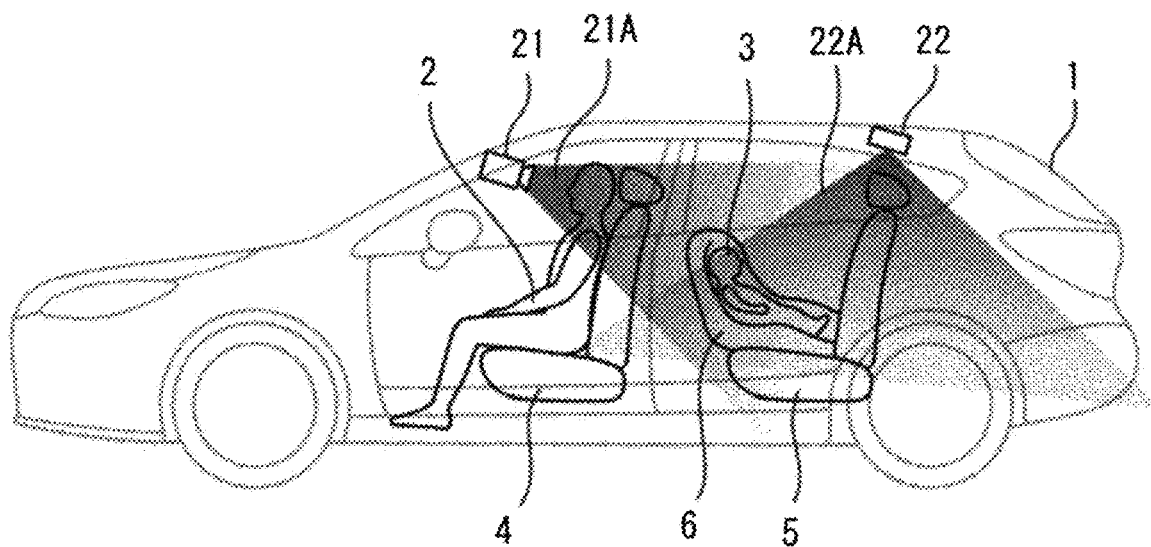
FIG. 2 is an explanatory diagram illustrating an installation example of a sensor according to the first embodiment.
Figure 3:
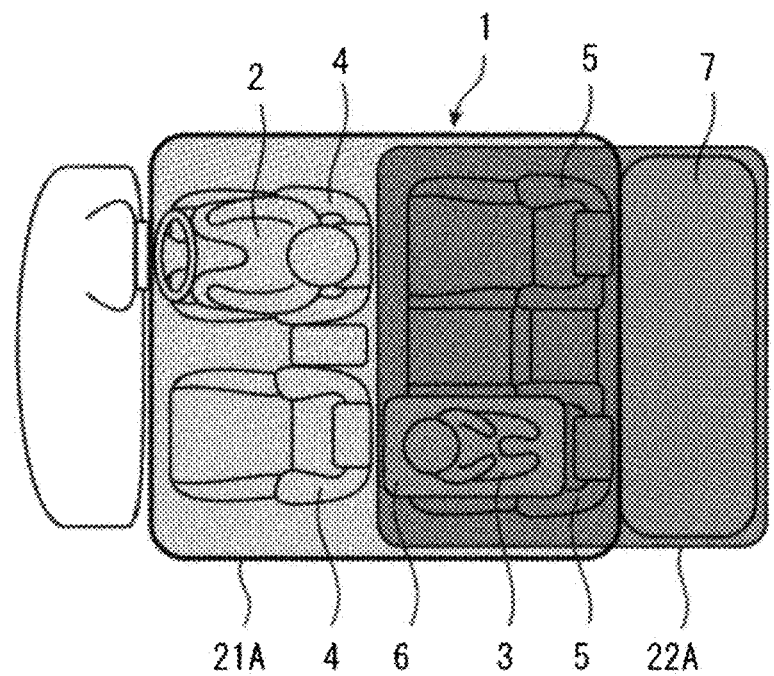
FIG. 3 is an explanatory diagram illustrating an example of a detection range of the sensor according to the first embodiment.

FIG. 2 is an explanatory diagram illustrating an installation example of the sensor 20 according to the first embodiment, and FIG. 3 is an explanatory diagram illustrating an example of detection ranges 21A and 22A of the sensor 20 according to the first embodiment. In the example of FIGS. 2 and 3, the occupant 2 is seated on a front seat 4 of the vehicle 1, a child safety seat 6 is attached to a rear seat 5, and an infant that is the notification object 3 is seated on the child safety seat 6. Hereinafter, the front seat 4 and the rear seat 5 are collectively referred to as "a seat".

In addition, FIGS. 2 and 3 illustrate an example in which the sensor 20 is a combination of an imaging device 21 that images the inside of the vehicle and a radio wave sensor 22 disposed on the ceiling of a vehicle interior. The imaging device 21 is disposed in an overhead console or the like of the vehicle interior in such a manner that at least the occupant 2 in the front seat 4 is included in the detection range 21A, and acquires an image obtained by imaging the inside of the vehicle.

The radio wave sensor 22 is, for example, a Doppler sensor that transmits a millimeter wave and receives a reflected wave obtained by reflection of the millimeter wave by a moving object. The radio wave sensor 22 measures a distance from an installation position of the radio wave sensor 22 to the object using the transmission and reception result of the millimeter wave, and acquires the measurement result as distance data. In addition, the radio wave sensor 22 is disposed on the ceiling or the like of the vehicle interior of the vehicle 1 in such a manner that at least the notification object 3 in the rear seat 5 is included in the detection range 22A. In addition, the radio wave sensor 22 may measure a distance to an object in a trunk 7 by including the trunk 7 in the detection range 22A in addition to the rear seat 5. Note that detecting the occupant 2 and the notification object 3 will be described later in detail.

The in-vehicle monitoring device 10 includes: an in-vehicle information acquisition unit 12 that acquires in-vehicle information from the sensor 20; an occupant detection unit 13 that detects the occupant 2 in the vehicle; a notification object detection unit 14 that detects the notification object 3 in the vehicle; a first ride determination unit 15 that determines whether ride of the occupant 2 or the notification object 3 in the vehicle is a first ride; a left-behind determination unit 16 that determines whether the notification object 3 is left behind in the vehicle; and a notification control unit 17 that determines necessity of notification.

In addition, the in-vehicle monitoring device 10 includes a vehicle information acquisition unit 11. The vehicle information acquisition unit 11 acquires vehicle information indicating whether the vehicle 1 is standing. The vehicle information is, for example, information indicating a vehicle speed, a shift position, or the like acquired from a vehicle control device 300 that controls the engine and an in-vehicle device such as an air conditioner of the vehicle 1 and is mounted on the vehicle 1. The vehicle information acquisition unit 11 acquires vehicle information indicating that the vehicle 1 is standing in a case where a vehicle speed is 0 km/h or a shift position is parking, and acquires vehicle information indicating that the vehicle 1 is not standing in a case where the vehicle speed exceeds 0 km/h or the shift position is drive. Note that the vehicle control device 300 may include a vehicle side communication unit (not illustrated) that communicates with the key of the vehicle 1 or belongings of the occupant 2, such as a mobile terminal of the occupant 2. If the vehicle control device 300 includes the vehicle side communication unit, the vehicle control device 300 can detect, for example, that the occupant 2 who carries the key of the vehicle 1, a mobile terminal of the occupant 2, or the like has touched a door of the vehicle 1.

The in-vehicle information acquisition unit 12 is connected to the sensor 20 and acquires in-vehicle information indicating a situation in the vehicle. The in-vehicle information is information regarding a situation in the vehicle detected by the sensor 20, and is, for example, an image obtained by imaging the inside of the vehicle, acquired by the imaging device 21, or distance data acquired by the radio wave sensor 22. The occupant detection unit 13 and the notification object detection unit 14 acquire in-vehicle information from the in-vehicle information acquisition unit 12, and detect the occupant 2 in the vehicle and the notification object 3 in the vehicle, respectively.

Here, the in-vehicle information acquisition unit 12 may acquire boarding information regarding boarding of the occupant 2 or the notification object 3 on the vehicle 1 from the sensor 20 or the vehicle control device 300. In a case where the boarding information is acquired from the vehicle control device 300, it is only required to connect the in-vehicle information acquisition unit 12 to the vehicle control device 300. The boarding information is information regarding boarding of the occupant 2 or the notification object 3 on the vehicle 1 or alighting of the occupant 2 or the notification object 3 from the vehicle 1, such as information indicating that a door of the vehicle 1 has been opened, the door has been unlocked, the occupant 2 or the notification object 3 has touched the door of the vehicle 1, or the occupant 2 has moved away from the vehicle 1. For example, in a case where the in-vehicle information acquisition unit 12 acquires boarding information indicating that the occupant 2 or the notification object 3 has touched a door of the vehicle 1 from the outside of the vehicle, if the occupant detection unit 13 and the notification object detection unit 14 are caused to acquire in-vehicle information, it is possible to start acquisition of the in-vehicle information before the occupant 2 or the notification object 3 gets in the vehicle 1, and therefore it is possible to quickly respond to a change in a situation in the vehicle.

For example, in a case where the occupant detection unit 13 acquires an image taken by the imaging device 21 as in-vehicle information from the in-vehicle information acquisition unit 12, the occupant detection unit 13 detects the occupant 2 or the notification object 3 in the vehicle in the image, and determines the physique of the detected occupant 2 or notification object 3. Hereinafter, the occupant 2 and the notification object 3 are collectively referred to as "a detection object". Then, the occupant detection unit 13 determines whether the detected detection object is the occupant 2 or the notification object 3 on the basis of the determination result of the physique. In this way, the occupant detection unit 13 detects the occupant 2 in the vehicle using the in-vehicle information. Here, in a case where the occupant 2 in the vehicle is detected, not only an occupant 2 seated on the seat but also, for example, an occupant 2 who gets in the vehicle 1 in order to allow the notification object 3 to ride in the vehicle and is present in the vicinity of the seat may be detected.

Note that a user can set a determination criterion for determining whether the detected detection object is the occupant 2 or the notification object 3 in any manner. For example, a user may set the determination criterion in such a manner that even the occupant 2 who can go out of the vehicle by himself or herself is determined to be the notification object 3 if the occupant 2 is a child having a physique required to wear the child safety seat 6 or the like.

Meanwhile, for example, in a case where the notification object detection unit 14 acquires distance data of the radio wave sensor 22 as in-vehicle information from the in-vehicle information acquisition unit 12, the notification object detection unit 14 determines the physique of the detection object from a distance between the radio wave sensor 22 and the detection object. Then, the notification object detection unit 14 determines whether the detection object is the occupant 2 or the notification object 3 on the basis of the determination result of the physique. In this way, the notification object detection unit 14 detects the notification object 3 in the vehicle using the in-vehicle information.

The determination as to whether the detection object is the occupant 2 or the notification object 3 is not limited to the determination using the physique of the detection object. For example, a weight sensor may be disposed in each seat, and whether the detection object seated on the seat is the occupant 2 or the notification object 3 may be determined using a weight detected by the weight sensor. Note that, in the example of FIG. 1, the occupant detection unit 13 and the notification object detection unit 14 are illustrated separately, but detection of the occupant 2 in the vehicle and detection of the notification object 3 in the vehicle may be performed by one configuration.

The left-behind determination unit 16 determines whether the notification object 3 is left behind in the vehicle using detection results of the occupant detection unit 13 and the notification object detection unit 14. In a case where the occupant detection unit 13 does not detect the occupant 2 and the notification object detection unit 14 detects the notification object 3, the left-behind determination unit 16 determines that the notification object 3 is left behind in the vehicle. That is, the notification object 3 is left behind means that the notification object 3 is in the vehicle while the occupant 2 is not in the vehicle. Hereinafter, a state in which the notification object 3 is left behind in the vehicle is referred to as "a left-behind state". Then, the left-behind determination unit 16 outputs a determination result as to whether the notification object 3 is left behind in the vehicle to the notification control unit 17.

The first ride determination unit 15 is connected to the occupant detection unit 13, the notification object detection unit 14, and the vehicle control device 300, and determines whether ride of the occupant 2 or the notification object 3 in the vehicle 1 is a first ride using information acquired from at least one of the occupant detection unit 13, the notification object detection unit 14, and the vehicle control device 300.

Here, the term "first ride" means that the occupant 2 or the notification object 3 rides in the vehicle 1 in which neither the occupant 2 nor the notification object 3 is. For example, a use case where the occupant 2 who is a parent allows a child who is the notification object 3 to be seated on the child safety seat 6, and then the occupant 2 gets in the vehicle 1 and sits on the seat occurs in a case where ride of the occupant 2 or the notification object 3 in the vehicle 1 is a first ride. As described above, in a case where the ride of the occupant 2 or the notification object 3 in the vehicle 1 is a first ride, the notification object 3 may temporarily ride in the vehicle 1 alone. Therefore, in a case where the notification object 3 temporarily rides in the vehicle alone unavoidably, it is necessary to determine whether the ride of the occupant 2 or the notification object 3 in the vehicle 1 is a first ride in order not to cause the occupant 2 feel annoyance and stress due to notification. Hereinafter, the case where the ride of the occupant 2 or the notification object 3 in the vehicle 1 is a first ride is simply referred to as "a first ride", and the case where the ride of the occupant 2 or the notification object 3 in the vehicle 1 is not a first ride is simply referred to as "not a first ride".

An example of determination of whether the ride is a first ride by the first ride determination unit 15 will be described. For example, in a case where the first ride determination unit 15 acquires a signal indicating that a door of the vehicle 1 has been opened, the door has been unlocked, or the engine of the vehicle 1 has been remotely started in a state where the engine of the vehicle 1 is stopped from the vehicle control device 300 after acquiring a signal indicating that neither the occupant 2 nor the notification object 3 is in the vehicle from the occupant detection unit 13 and the notification object detection unit 14, the first ride determination unit 15 determines that the ride of the occupant 2 or the notification object 3 in the vehicle 1 is a first ride.

Meanwhile, for example, in a case where the first ride determination unit 15 acquires a signal indicating that a door of the vehicle 1 has been opened, the door has been unlocked, or an ignition has been turned ON from the vehicle control device 300 after acquiring a signal indicating that the occupant 2 or the notification object 3 is present in the vehicle from the occupant detection unit 13 and the notification object detection unit 14, the first ride determination unit 15 determines that the ride of the occupant 2 or the notification object 3 in the vehicle 1 is not a first ride. Then, the first ride determination unit 15 outputs the determination result to the notification control unit 17.

In addition, the first ride determination unit 15 may determine whether the ride of the occupant 2 or the notification object 3 in the vehicle 1 is a first ride on the basis of stop time of the vehicle 1. Here, the stop time of the vehicle 1 refers to a period from the time when the vehicle 1 stops to the time when the vehicle 1 starts.

In a case where it is determined whether the ride of the occupant 2 or the notification object 3 in the vehicle 1 is a first ride on the basis of the stop time of the vehicle 1, the first ride determination unit 15 acquires a signal indicating that the vehicle 1 has stopped and a signal indicating that the vehicle 1 has started from at least one of the occupant detection unit 13, the notification object detection unit 14, and the vehicle control device 300, and calculates the stop time of the vehicle 1. The first ride determination unit 15 acquires, for example, a signal indicating that neither the occupant 2 nor the notification object 3 is in the vehicle or information indicating that the door has been locked, a seat belt has been removed, the ignition has been turned OFF, a shift lever has moved to a parking position, a navigation device has ended guiding, the vehicle 1 has arrived at home, and the like, as a signal indicating that the vehicle 1 has stopped.

In addition, the first ride determination unit 15 acquires, for example, a signal indicating that the occupant 2 has touched a door of the vehicle 1 or information indicating that the door has been unlocked, the door has been opened, the seat belt has been fastened, the ignition has been turned ON, the shift lever has moved to a drive position, a vehicle speed has exceeded 0 km/h, a navigation device has started guiding, the vehicle 1 has left home, and the like, as a signal indicating that the vehicle 1 has started. In addition, the first ride determination unit 15 counts the stop time using a signal indicating that the vehicle 1 has stopped and a signal indicating that the vehicle 1 has started.

An example of counting the stop time will be described. For example, the first ride determination unit 15 records the time when the ignition is turned OFF as preceding stop time of the vehicle 1, and starts counting the stop time. Meanwhile, for example, the first ride determination unit 15 records the time when the occupant 2 or the notification object 3 is detected to have touched the door of the vehicle 1 from the outside of the vehicle in a state where the ignition is turned OFF as start time of the vehicle 1, and ends counting the stop time. Then, the first ride determination unit 15 calculates time during which counting continues as the stop time of the vehicle 1. Note that the calculation of the stop time may be performed by the first ride determination unit 15, or may be performed by a calculation unit (not illustrated) included in the in-vehicle monitoring device 10. Here, the start time of the vehicle 1 includes not only the time when the engine of the vehicle 1 starts, such as the time when the ignition is turned ON, but also the time when preparation for starting the vehicle 1 is started, such as the time when the door of the vehicle 1 in which neither the occupant 2 nor the notification object 3 is in the vehicle is opened, or the occupant 2 or the notification object 3 touches the door from the outside of the vehicle, in a state where the ignition is turned OFF.

Furthermore, the first ride determination unit 15 determines whether the ride is a first ride depending on whether the calculated stop time is equal to or longer than set time (hereinafter, referred to as "set time"). For example, a use case where the occupant 2 who is a parent allows a child who is the notification object 3 to be seated on the child safety seat 6, and then the occupant 2 gets in the vehicle 1 and sits on the seat is considered, it is only required to set the set time to about 30 minutes. This set time is based on the fact that the stop time of the vehicle 1 from the time when the vehicle 1 stops and the notification object 3 is taken out of the vehicle 1 to the time of first ride in the vehicle 1, such as getting on the vehicle 1 again after an end of necessary use such as shopping, is about 30 minutes. That is, the first ride determination unit 15 determines that the ride is a first ride if the calculated stop time is equal to or longer than the set time, and determines that the ride is not a first ride if the calculated stop time is shorter than the set time. Note that the set time is not limited to about 30 minutes, and can be appropriately set and changed on the basis of a use case to be considered.

The notification control unit 17 is connected to a notification unit 200 which is a device connected to the vehicle 1, and in a case where the notification control unit 17 determines that notification is necessary, notification is performed by the notification unit 200 being operated. Here, the notification unit 200 may be, for example, at least one of a speaker and a display mounted on the vehicle 1, may be a mobile terminal or the like carried by the occupant 2, or may be a hazard lamp or a horn mounted on the vehicle 1. Notification to the occupant 2 of the vehicle 1, a person outside the vehicle, or the like is performed by the notification unit 200 being operated by the notification control unit 17. Note that, in a case where a mobile terminal carried by the occupant 2 is caused to perform notification, it is only required to cause the notification control unit 17 to communicate with the mobile terminal by connecting the notification control unit 17 to a communication unit (not illustrated). In addition to causing the notification unit 200 to perform notification, for example, the notification control unit 17 may cause the communication unit to perform emergency notification to an emergency center or the like, or may cause the vehicle control device 300 to control an in-vehicle device such as an air conditioner by connection to the vehicle control device 300.

Furthermore, the notification control unit 17 acquires a determination result as to whether the notification object 3 is left behind in the vehicle from the left-behind determination unit 16, and acquires a determination result as to whether the ride of the occupant 2 or the notification object 3 in the vehicle 1 is a first ride from the first ride determination unit 15. Then, the notification control unit 17 determines whether to cause the notification unit 200 to notify that the notification object 3 is left behind in the vehicle depending on whether a condition related to determination of necessity of notification is satisfied, and determines that notification by the notification unit 200 is necessary if the condition related to determination of necessity of notification is satisfied. Hereinafter, determination on whether it is necessary to cause the notification unit 200 to notify that the notification object 3 is left behind in the vehicle is referred to as "determination of necessity of notification".

Next, determination of necessity of notification by the notification control unit 17 will be described. In a case where the ride of the occupant 2 or the notification object 3 in the vehicle 1 is a first ride, it is assumed that the notification object 3 temporarily rides in the vehicle 1 alone unavoidably, such as in a use case where the occupant 2 who is a parent allows a child who is the notification object 3 to be seated on the child safety seat 6, and then the occupant 2 gets in the vehicle 1 and sits on the seat. In a case where the notification object 3 temporarily rides in the vehicle 1 alone unavoidably, the notification control unit 17 needs to determine necessity of notification using different conditions on the basis of whether the ride of the occupant 2 or the notification object 3 in the vehicle 1 is a first ride in order not to make the occupant 2 feel annoyance and stress due to notification.

Therefore, if a set first condition is satisfied, the notification control unit 17 determines that notification is necessary. Furthermore, in a case where the first ride determination unit 15 determines that the ride is not a first ride, if the first condition is satisfied, the notification control unit 17 determines that notification is necessary, and meanwhile, in a case where the first ride determination unit 15 determines that the ride is a first ride, if a second condition relaxed as compared with the first condition is satisfied, the notification control unit 17 determines that notification is necessary. That is, the notification control unit 17 determines necessity of notification using the first condition in a case where the first ride determination unit 15 determines that the ride is not a first ride, and determines necessity of notification using the second condition relaxed as compared with the first condition in a case where the first ride determination unit 15 determines that the ride is a first ride. This makes it possible to notify that the notification object 3 is left behind, and to eliminate annoyance and stress due to notification in a case where the notification object 3 temporarily rides in the vehicle 1 alone unavoidably.

In the present embodiment, the notification control unit 17 acquires time during which the notification object 3 is left behind in the vehicle (hereinafter, referred to as "elapsed time") from the left-behind determination unit 16, and determines necessity of notification using the elapsed time and an allowable range regarding the elapsed time. In a case where the first ride determination unit 15 determines that the ride is not a first ride, if the first condition is satisfied, that is, if the elapsed time is outside an allowable range, the notification control unit 17 determines that notification is necessary, and in a case where the first ride determination unit 15 determines that the ride is a first ride, if the second condition relaxed as compared with the first condition is satisfied, that is, if the elapsed time is outside an allowable range having a range wider than the allowable range used in the first condition, the notification control unit 17 determines that notification is necessary. Hereinafter, for the sake of explanation, the allowable range used in the first condition is referred to as "a first time allowable range", and the allowable range used in the second condition is referred to as "a second time allowable range". The first time allowable range and the second time allowable range are collectively referred to as "a time allowable range".

Examples of the first time allowable range and the second time allowable range will be described. The first time allowable range is, for example, a range of 0 seconds or more and 5 seconds or less in a case where an upper limit of the allowable elapsed time is 5 seconds. Meanwhile, the second time allowable range is a range wider than the first time allowable range, and for example, a range of 0 seconds or more and 10 seconds or less in a case where an upper limit of the allowable elapsed time is 10 seconds. Note that the upper limit of the allowable elapsed time in the second time allowable range is larger than the upper limit of the allowable elapsed time in the first time allowable range.

Figure 4:
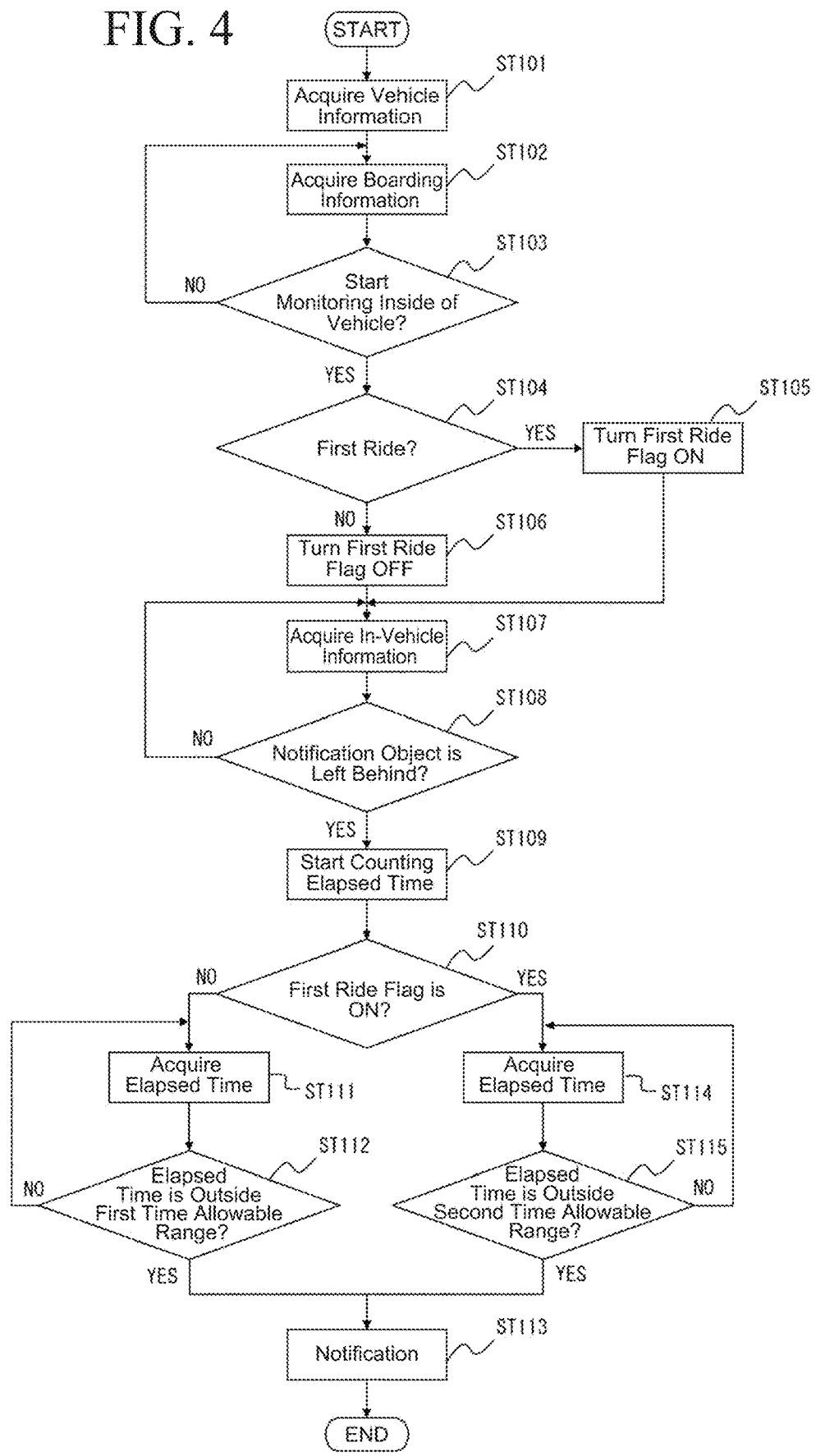
FIG. 4 is a flowchart illustrating an operation example of an in-vehicle monitoring device according to the first embodiment.

Next, an operation of the in-vehicle monitoring device 10 will be described. FIG. 4 is a flowchart illustrating an example of the operation of the operation of the in-vehicle monitoring device 10 according to the first embodiment. First, the vehicle information acquisition unit 11 acquires vehicle information indicating whether the vehicle is standing from the vehicle control device 300 (ST101). Here, the vehicle information acquired by the vehicle information acquisition unit 11 is, for example, information indicating a vehicle speed or a shift position.

Next, the in-vehicle information acquisition unit 12 acquires boarding information regarding boarding of the occupant 2 from the sensor 20 or the vehicle control device 300 (ST102). Then, the notification control unit 17 determines whether to start monitoring the inside of the vehicle using the vehicle information and the boarding information acquired from the vehicle information acquisition unit 11 and the in-vehicle information acquisition unit 12 (ST103). The notification control unit 17 starts monitoring the inside of the vehicle, for example, if the vehicle information acquired by the vehicle information acquisition unit 11 includes information indicating that the vehicle 1 is standing, and the in-vehicle information acquisition unit 12 acquires boarding information indicating that the occupant 2 or the notification object 3 gets in the vehicle 1 or gets out of the vehicle 1, such as information indicating that the door of the vehicle 1 has been opened (ST103; YES). Here, the monitoring of the inside of the vehicle means that the left-behind determination unit 16 determines whether the notification object 3 is left behind in the vehicle, and the notification control unit 17 determines necessity of notification.

If the vehicle information does not include information indicating that the vehicle 1 is standing or boarding information regarding boarding of the occupant 2 on the vehicle 1 is not detected, the notification control unit 17 determines not to monitor the inside of the vehicle (ST103; NO), and the processes of ST101 to ST103 described above are repeated. Note that the notification control unit 17 may monitor the inside of the vehicle, for example, while the vehicle 1 is standing regardless of whether the in-vehicle information acquisition unit 12 has acquired the boarding information.

The process after the monitoring of the inside of the vehicle is started will be described. After the monitoring of the inside of the vehicle is started, the first ride determination unit 15 determines whether the ride of the occupant 2 or the notification object 3 in the vehicle 1 is a first ride using information acquired from at least one of the occupant detection unit 13, the notification object detection unit 14, and the vehicle control device 300 (ST104). Then, if the first ride determination unit 15 determines that the ride is a first ride (ST104; YES), the first ride determination unit 15 turns a first ride flag ON (ST105). Here, the first ride flag may be recorded in the first ride determination unit 15 or may be recorded in a storage unit (not illustrated) connected to the in-vehicle monitoring device 10. Meanwhile, if the first ride determination unit 15 determines that the ride of the occupant 2 or the notification object 3 in the vehicle 1 is not a first ride (ST104; NO), the first ride determination unit 15 turns a first ride flag OFF (ST106).

The in-vehicle information acquisition unit 12 acquires in-vehicle information from the sensor 20 (ST107). Then, the occupant detection unit 13 and the notification object detection unit 14 detect the occupant 2 in the vehicle and the notification object 3 in the vehicle, respectively, using the in-vehicle information acquired by the in-vehicle information acquisition unit 12.

Next, the left-behind determination unit 16 determines whether the notification object 3 is left behind in the vehicle using detection results of the occupant detection unit 13 and the notification object detection unit 14 (ST108). If the occupant detection unit 13 detects the occupant 2 in the vehicle or the notification object detection unit 14 does not detect the notification object 3 in the vehicle, the left-behind determination unit 16 determines that the notification object 3 is not left behind in the vehicle (ST108; NO). Then, the process proceeds to ST108, and the occupant 2 and the notification object 3 are detected. Note that, in a case where it is found in the process of ST109 that neither the occupant 2 nor the notification object 3 is in the vehicle, and the in-vehicle information acquisition unit 12 acquires boarding information indicating that the occupant 2 has moved away from the vehicle 1, the monitoring of the inside of the vehicle may be ended.

Meanwhile, if the occupant detection unit 13 does not detect the occupant 2 in the vehicle and the notification object detection unit 14 detects the notification object 3 in the vehicle, the left-behind determination unit 16 determines that the notification object 3 is left behind in the vehicle (ST108; YES). Then, the left-behind determination unit 16 starts counting the elapsed time (ST109). Here, the state in which the notification object 3 is left behind in the vehicle includes not only a case where the left-behind state is continued but also a case where the left-behind state is temporarily eliminated by opening of the door by the occupant 2 or the like and then the left-behind state occurs again. In addition, in a case where the left-behind state is temporarily eliminated, it is only required to exclude time during which the left-behind state is eliminated from the elapsed time, or to reset counting when the left-behind state is eliminated. Note that counting of the elapsed time may be performed by the left-behind determination unit 16 or may be performed by the calculation unit of the in-vehicle monitoring device 10.

Then, the notification control unit 17 determines necessity of notification. Here, the notification control unit 17 refers to the first ride flag recorded in the first ride determination unit 15 or the storage unit, and refers to whether the first ride flag is ON (ST110), that is, whether the ride of the occupant 2 or the notification object 3 in the vehicle 1 is a first ride. Furthermore, in a case where the first ride flag is ON, the notification control unit 17 determines necessity of notification using a condition relaxed as compared with a case where the first ride flag is OFF. Hereinafter, an example will be described in which the notification control unit 17 determines necessity of notification on the basis of whether the elapsed time is outside the first time allowable range in a case where the first ride flag is OFF, and determines necessity of notification on the basis of whether the elapsed time is outside the second time allowable range having a range wider than the first time allowable range in a case where the first ride flag is ON.

If the first ride flag is OFF (ST110; NO), that is, if the first ride determination unit 15 determines that the ride is not a first ride, the notification control unit 17 acquires elapsed time from the left-behind determination unit 16 (ST111), and determines whether the elapsed time is outside the first time allowable range (ST112). If the elapsed time is within the first time allowable range (ST112; NO), the process proceeds to ST111, and the notification control unit 17 acquires the elapsed time. If the elapsed time is outside the first time allowable range (ST112; YES), the notification control unit 17 determines that the first condition is satisfied and notification by notification unit 200 connected to the vehicle 1 is necessary, and causes the notification unit 200 to perform notification (ST113).

Note that the elapsed time being outside the first time allowable range means that the elapsed time exceeds the upper limit of the first time allowable range, and the elapsed time being within the first time allowable range means that the elapsed time is equal to or shorter than the upper limit of the first time allowable range. If the left-behind state is eliminated, for example, if the occupant 2 is detected by the occupant detection unit 13 while the notification unit 200 performs notification, the notification of the notification unit 200 may be ended.

Meanwhile, if the first ride flag is ON (ST110; YES), that is, if the first ride determination unit 15 determines that the ride is a first ride, the notification control unit 17 acquires elapsed time from the left-behind determination unit 16 (ST114), and determines whether the elapsed time is outside the second time allowable range (ST115). If the elapsed time is within the second time allowable range (ST115; NO), the process proceeds to ST114, and the notification control unit 17 acquires the elapsed time.

If the elapsed time is outside the second time allowable range (ST115; YES), the notification control unit 17 determines that the second condition is satisfied and notification by notification unit 200 connected to the vehicle 1 is necessary, and causes the notification unit 200 to perform notification (ST113). Note that the elapsed time being outside the second time allowable range means that the elapsed time exceeds the upper limit of the second time allowable range, and the elapsed time being within the second time allowable range means that the elapsed time is equal to or shorter than the upper limit of the second time allowable range. Here, since the second time allowable range is a range wider than the first time allowable range, in a case where the ride is a first ride, for example, the occupant 2 can obtain an extended period before notification is performed after the notification object 3 is seated on the child safety seat 6, as compared with a case where the ride is not a first ride.

As described above, in a case where the first ride determination unit 15 determines that the ride is not a first ride, necessity of notification is determined using the first time allowable range, and in a case where the first ride determination unit 15 determines that the ride is a first ride, necessity of notification is determined using the second time allowable range having a range wider than the first time allowable range. That is, in a case where the ride is a first ride, the condition for determining necessity of notification is relaxed as compared with the case where the ride is not a first ride, and therefore an extended period is generated before notification is issued to the occupant 2. As a result, in a case where the notification object 3 temporarily rides in the vehicle 1 alone unavoidably, annoyance and stress due to notification can be eliminated.

Next, a hardware configuration for implementing a function of the in-vehicle monitoring device 10 will be described. FIG. 5 is a diagram illustrating a hardware configuration example of the in-vehicle monitoring device 10 according to the first embodiment. Functions of the vehicle information acquisition unit 11, the in-vehicle information acquisition unit 12, the occupant detection unit 13, the notification object detection unit 14, the first ride determination unit 15, the left-behind determination unit 16, and the notification control unit 17 in the in-vehicle monitoring device 10 are implemented by a processing circuitry. That is, the vehicle information acquisition unit 11, the in-vehicle information acquisition unit 12, the occupant detection unit 13, the notification object detection unit 14, the first ride determination unit 15, the left-behind determination unit 16, and the notification control unit 17 of the in-vehicle monitoring device 10 may be a processing circuitry 10a that is dedicated hardware as illustrated in FIG. 5A, or may be a processor 10b that executes a program stored in a memory 10c as illustrated in FIG. 5B.

Figure 5A:
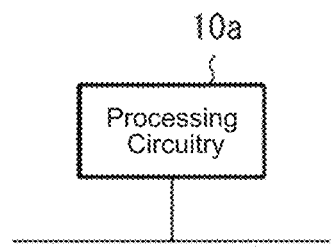
FIGS. 5A and 5B are diagrams illustrating a hardware configuration example of the in-vehicle monitoring device according to the first embodiment.

As illustrated in FIG. 5A, in a case where the vehicle information acquisition unit 11, the in-vehicle information acquisition unit 12, the occupant detection unit 13, the notification object detection unit 14, the first ride determination unit 15, the left-behind determination unit 16, and the notification control unit 17 are dedicated hardware, for example, a single circuit, a composite circuit, a programmed processor, a parallel programmed processor, an application specific integrated circuit (ASIC), a field-programmable gate array (FPGA), or a combination thereof corresponds to the processing circuitry 10a. Each of the functions of the vehicle information acquisition unit 11, the in-vehicle information acquisition unit 12, the occupant detection unit 13, the notification object detection unit 14, the first ride determination unit 15, the left-behind determination unit 16, and the notification control unit 17 may be implemented by a processing circuitry, or the functions of the units may be collectively implemented by one processing circuitry.

Figure 5B:
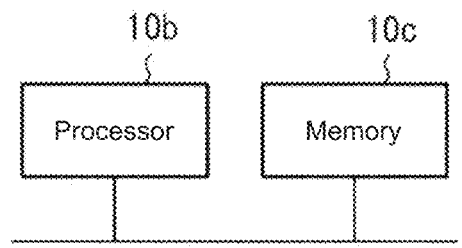

As illustrated in FIG. 5B, in a case where the vehicle information acquisition unit 11, the in-vehicle information acquisition unit 12, the occupant detection unit 13, the notification object detection unit 14, the first ride determination unit 15, the left-behind determination unit 16, and the notification control unit 17 are the processor 10b, the functions of the units are implemented by software, firmware, or a combination of software and firmware. The software or the firmware is described as a program and stored in the memory 10c. The processor 10b implements the functions of the vehicle information acquisition unit 11, the in-vehicle information acquisition unit 12, the occupant detection unit 13, the notification object detection unit 14, the first ride determination unit 15, the left-behind determination unit 16, and the notification control unit 17 by reading and executing the program stored in the memory 10c. That is, the vehicle information acquisition unit 11, the in-vehicle information acquisition unit 12, the occupant detection unit 13, the notification object detection unit 14, the first ride determination unit 15, the left-behind determination unit 16, and the notification control unit 17 include the memory 10c for storing a program that causes the steps illustrated in FIG. 4 to be executed as a result when the program is executed by the processor 10b. It can be said that the program causes a computer to execute procedures or methods performed by the vehicle information acquisition unit 11, the in-vehicle information acquisition unit 12, the occupant detection unit 13, the notification object detection unit 14, the first ride determination unit 15, the left-behind determination unit 16, and the notification control unit 17.

Here, the processor 10b is, for example, a central processing unit (CPU), a processing device, an arithmetic device, a processor, a microprocessor, a microcomputer, or a digital signal processor (DSP). The memory 10c may be a nonvolatile or volatile semiconductor memory such as random access memory (RAM), read only memory (ROM), flash memory, erasable programmable ROM (EPROM), or electrically EPROM (EEPROM), may be a magnetic disk such as a hard disk or a flexible disk, or may be an optical disc such as a mini disc, a compact disc (CD), or a digital versatile disc (DVD).

Note that some of the functions of the vehicle information acquisition unit 11, the in-vehicle information acquisition unit 12, the occupant detection unit 13, the notification object detection unit 14, the first ride determination unit 15, the left-behind determination unit 16, and the notification control unit 17 may be implemented by dedicated hardware, and some of the functions may be implemented by software or firmware. In this way, the processing circuitry 10a in the in-vehicle monitoring device 10 can implement the above-described functions by hardware, software, firmware, or a combination thereof. In addition, at least some of the functions of the vehicle information acquisition unit 11, the in-vehicle information acquisition unit 12, the occupant detection unit 13, the notification object detection unit 14, the first ride determination unit 15, the left-behind determination unit 16, and the notification control unit 17 may be executed by an external server.

As described above, by including: the in-vehicle information acquisition unit 12 that acquires in-vehicle information indicating a situation in a vehicle from the sensor 20 that detects an object in the vehicle; the occupant detection unit 13 that detects the occupant 2 in the vehicle using the in-vehicle information acquired from the in-vehicle information acquisition unit 12; the notification object detection unit 14 that detects the notification object 3 in the vehicle using the in-vehicle information acquired from the in-vehicle information acquisition unit 12; the first ride determination unit 15 that determines whether ride of the occupant 2 or the notification object 3 in the vehicle 1 is a first ride; the left-behind determination unit 16 that determines whether the notification object is left behind in the vehicle using detection results of the occupant detection unit 13 and the notification object detection unit 14; and the notification control unit 17 that determines that notification is necessary if a set first condition is satisfied in a case where the left-behind determination unit 16 determines that the notification object 3 is left behind, in which the notification control unit 17 determines necessity of notification using a second condition relaxed as compared with the first condition in a case where the ride is not a first ride, it is possible to notify that the notification object 3 is left behind in the vehicle, and to eliminate annoyance and stress due to notification in a case where the notification object 3 temporarily rides in the vehicle 1 alone unavoidably.

Note that an example has been described in which, in the present embodiment, the occupant detection unit 13 detects the occupant 2 in the vehicle from the taken image by the imaging device 21, and the notification object detection unit 14 detects the notification object 3 in the vehicle from the distance data of the radio wave sensor 22. However, the occupant detection unit 13 and the notification object detection unit 14 may use either the taken image by the imaging device 21 or the distance data of the radio wave sensor 22, or may use both the taken image by the imaging device 21 and the distance data of the radio wave sensor 22, as in-vehicle information used to detect the occupant 2 and the notification object 3 in the vehicle, respectively. For example, if the occupant detection unit 13 and the notification object detection unit 14 detect the occupant 2 and the notification object 3 in the vehicle, respectively, using both the taken image by the imaging device 21 and the distance data of the radio wave sensor 22, reliability of the determination result of the left-behind determination unit 16 can be improved.

In addition, an example has been described in which the first ride determination unit 15 is connected to all of the occupant detection unit 13, the notification object detection unit 14, and the vehicle control device 300, but it is not limited to the case where the first ride determination unit 15 is connected to all of the occupant detection unit 13, the notification object detection unit 14, and the vehicle control device 300. If the first ride determination unit 15 can determine whether the ride of the occupant 2 or the notification object 3 in the vehicle 1 is a first ride, that is, can acquire information necessary for determining whether the ride is a first ride, the first ride determination unit 15 does not have to be connected to all of the occupant detection unit 13, the notification object detection unit 14, and the vehicle control device 300.

In addition, the in-vehicle information used by each of the occupant detection unit 13 and the notification object detection unit 14 is not limited to the taken image by the imaging device 21 and the distance data of the radio wave sensor 22. If the occupant 2 and the notification object 3 are detected with the single sensor 20 that acquires the in-vehicle information, the devices mounted on the vehicle 1 can be simplified. Meanwhile, if a plurality of the sensors 20 such as the imaging device 21 and the radio wave sensor 22 is used to acquire the in-vehicle information, reliability of detection results of the occupant detection unit 13 and the notification object detection unit 14 can be improved.

Furthermore, at least one of the occupant detection unit 13 and the notification object detection unit 14 may acquire, from a voice sensor such as a microphone, a voice uttered from a detection object in the vehicle, perform analysis such as estimation of the age of the detection object that has uttered the voice, and determine whether the voice has been uttered from the occupant 2 or has been uttered from the notification object 3. For example, reliability of the detection results can be improved by using the determination result on a voice generation source for complementing the detection result of each of the occupant detection unit 13 and the notification object detection unit 14. Note that, even when the occupant detection unit 13 and the notification object detection unit 14 can detect neither the occupant 2 nor the notification object 3 from the in-vehicle information obtained from another sensor different from the voice sensor among the sensors 20, if the occupant detection unit 13 and the notification object detection unit 14 detect that the notification object 3 is present in the vehicle from a voice obtained from the voice sensor, the left-behind determination unit 16 may determine that the notification object 3 is left behind. In this way, even when the notification object 3 cannot be detected due to malfunction or the like of another sensor different from the voice sensor among the sensors 20, if the voice sensor is operating, the left-behind determination unit 16 can determine at least whether the notification object 3 is left behind, and detection omission of the left-behind state can be prevented.

Second Embodiment

As in the first embodiment, an in-vehicle monitoring device 30 according to a second embodiment includes: an in-vehicle information acquisition unit 12 that acquires in-vehicle information from a sensor 20; an occupant detection unit 13 that detects an occupant 2 in a vehicle; a notification object detection unit 14 that detects a notification object 3 in the vehicle; a first ride determination unit 15 that determines whether ride of the occupant 2 or the notification object 3 in a vehicle 1 is a first ride; a left-behind determination unit 16 that determines whether the notification object 3 is left behind in the vehicle; and a notification control unit 31 that determines necessity of notification. The present embodiment is different from the first embodiment in that the in-vehicle monitoring device 30 further includes an environment information acquisition unit 32. The same components as those in the first embodiment are denoted by the same reference signs, and description thereof will be omitted.

Figure 6:
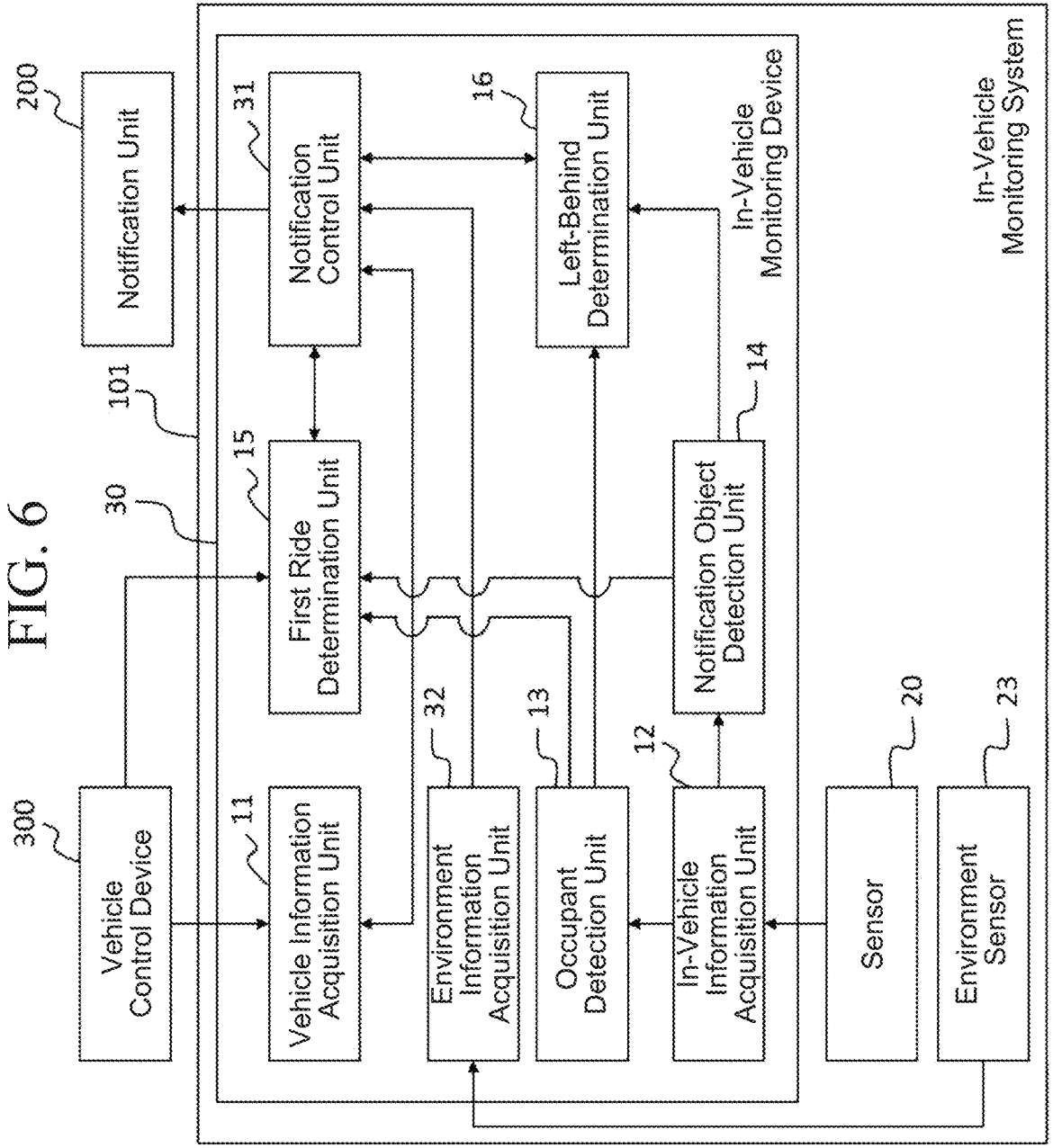
FIG. 6 is a block diagram illustrating a configuration example of an in-vehicle monitoring system according to a second embodiment.

FIG. 6 is a block diagram illustrating a configuration example of an in-vehicle monitoring system 101 according to the second embodiment. The environment information acquisition unit 32 is connected to an environment sensor 23 that detects an environment inside or outside a vehicle, and acquires environment information indicating the environment inside or outside the vehicle. The environment information is, for example, a temperature, a carbon monoxide concentration, or a carbon dioxide concentration inside or outside the vehicle. The environment sensor 23 is, for example, a temperature sensor, a carbon monoxide concentration meter, or a carbon dioxide concentration meter.

The notification control unit 31 determines necessity of notification using the environment information acquired by the environment information acquisition unit 32. That is, when acquiring the environment information indicating the environment inside or outside the vehicle from the environment information acquisition unit 32, the notification control unit 31 determines that notification is not necessary if the environment information is within an allowable range, and determines that the notification is necessary if the environment information is outside the allowable range.

Incidentally, an environment inside of the vehicle is rapidly worsened in a relatively short time depending on an environment in which the vehicle 1 is, such as a high temperature inside the vehicle in summer and a low temperature inside the vehicle in winter. In a case where the occupant 2 or the notification object 3 is alone in the vehicle 1, it is assumed that the inside of the vehicle 1 in which the occupant 2 or the notification object 3 gets is already in a harsh environment as described above. Therefore, for example, in a use case where the occupant 2 who is a parent allows a child who is the notification object 3 to be seated on a child safety seat 6, and then the occupant 2 sits on a seat of the vehicle 1, the notification object 3 temporarily rides in the vehicle 1 in the harsh environment alone. In order to prevent notification caused by the vehicle in the harsh environment from being issued to the occupant 2 who does not intend to leave the notification object 3 behind, that is, in order not to make the occupant 2 feel annoyance and stress due to notification in a case where the notification object 3 temporarily rides in the vehicle 1 alone unavoidably, in a case where the first ride determination unit 15 determines that the ride is a first ride, the notification control unit 31 needs to determine necessity of notification using a condition relaxed as compared with a case where the first ride determination unit 15 determines that the ride is not a first ride.

Note that, in a case where the first ride determination unit 15 determines whether the ride is a first ride depending on whether stop time of the vehicle 1 is set time, that is, in a case where the first ride determination unit 15 determines that the ride is a first ride if the stop time is equal to or longer than the set time and determines that the ride is not a first ride if the stop time is shorter than the set time, it is only required to set the set time to, for example, about 10 minutes. This is for the purpose of considering a case where the inside of the vehicle is already in a harsh environment at the time of a first ride even if time from the time when the vehicle 1 stops and the notification object 3 is taken out of the vehicle 1 to the time of the first ride in the vehicle 1 is short, as in a case of getting on the vehicle 1 again after an end of necessary use such as shopping, because the inside of the vehicle falls into a harsh environment in a relatively short time depending on an environment in which the vehicle 1 is present as described above.

In the present embodiment, the notification control unit 31 determines necessity of notification using the environment information acquired from the environment information acquisition unit 32 and an allowable range regarding the environment information. In a case where the first ride determination unit 15 determines that the ride is not a first ride, if the set first condition is satisfied, that is, if the environment information is outside an allowable range, the notification control unit 31 determines that notification is necessary, and in a case where the first ride determination unit 15 determines that the ride is a first ride, if the second condition relaxed as compared with the first condition is satisfied, that is, if the environment information is outside an allowable range having a range wider than the allowable range used in the first condition, the notification control unit 31 determines that notification is necessary. Hereinafter, for the sake of explanation, the allowable range used in the first condition is referred to as "a first environment allowable range", and the allowable range used in the second condition is referred to as "a second environment allowable range". The first environment allowable range and the second environment allowable range are collectively referred to as "an environment allowable range".

Examples of the first environment allowable range and the second environment allowable range will be described. For example, in a case where an allowable upper limit temperature is set to 30° C. and an allowable lower limit temperature is set to 5° C., the first environment allowable range of temperature is a range of 5° C. or higher and 30° C. or lower. Here, the first environment allowable range of temperature is a range in which health of the notification object 3 in the vehicle is maintained. The first environment allowable range of carbon monoxide concentration is, for example, a range in which an instantaneous value of the carbon monoxide concentration in the vehicle is equal to or less than 10 parts per million (ppm). Here, the first environment allowable range of carbon monoxide concentration is based on the regulation that "an average of one hour values over 24 consecutive hours is equal to or less than 10 ppm" as a safety standard of carbon monoxide of the Environment Basic Law. The first environment allowable range of carbon dioxide concentration is, for example, a range in which the carbon dioxide concentration in the vehicle is equal to or less than 1000 ppm. Here, the first environment allowable range of carbon dioxide concentration is based on the fact that it is determined that a change in human physical condition, such as discomfort or drowsiness, does not occur when the carbon dioxide concentration is equal to or less than 1000 ppm. That is, for example, in a case where the notification control unit 31 determines necessity of notification depending on whether the carbon dioxide concentration is outside the first environment allowable range, if the carbon dioxide concentration in the vehicle exceeds 1000 ppm, the notification control unit 31 causes the notification unit 200 to perform notification.

Meanwhile, the second environment allowable range is set to a range wider than the first environment allowable range. For example, in a case where an allowable upper limit temperature is set to 35° C. and an allowable lower limit temperature is set to 0° C., the second environment allowable range of temperature is a range of 0° C. or higher and 35° C. or lower. The second environment allowable range of a carbon monoxide concentration is, for example, a range in which an instantaneous value is equal to or less than 20 parts per million (ppm). Here, the second environment allowable range of carbon monoxide concentration is based on the regulation that "an average of eight hour values over 24 consecutive hours is equal to or less than 20 ppm" as a safety standard of carbon monoxide of the Environment Basic Law. The second environment allowable range of carbon dioxide concentration is, for example, a range of equal to or less than 2000 ppm. That is, for example, in a case where the notification control unit 31 determines necessity of notification depending on whether the carbon dioxide concentration is outside the second environment allowable range, if the carbon dioxide concentration in the vehicle exceeds 2000 ppm, the notification control unit 31 causes the notification unit 200 to perform notification. Note that lower limits of the carbon monoxide concentration and the carbon dioxide concentration in the first environment allowable range and the second environment allowable range only need to be, for example, about the carbon monoxide concentration and the carbon dioxide concentration in the air, respectively.

Figure 7:
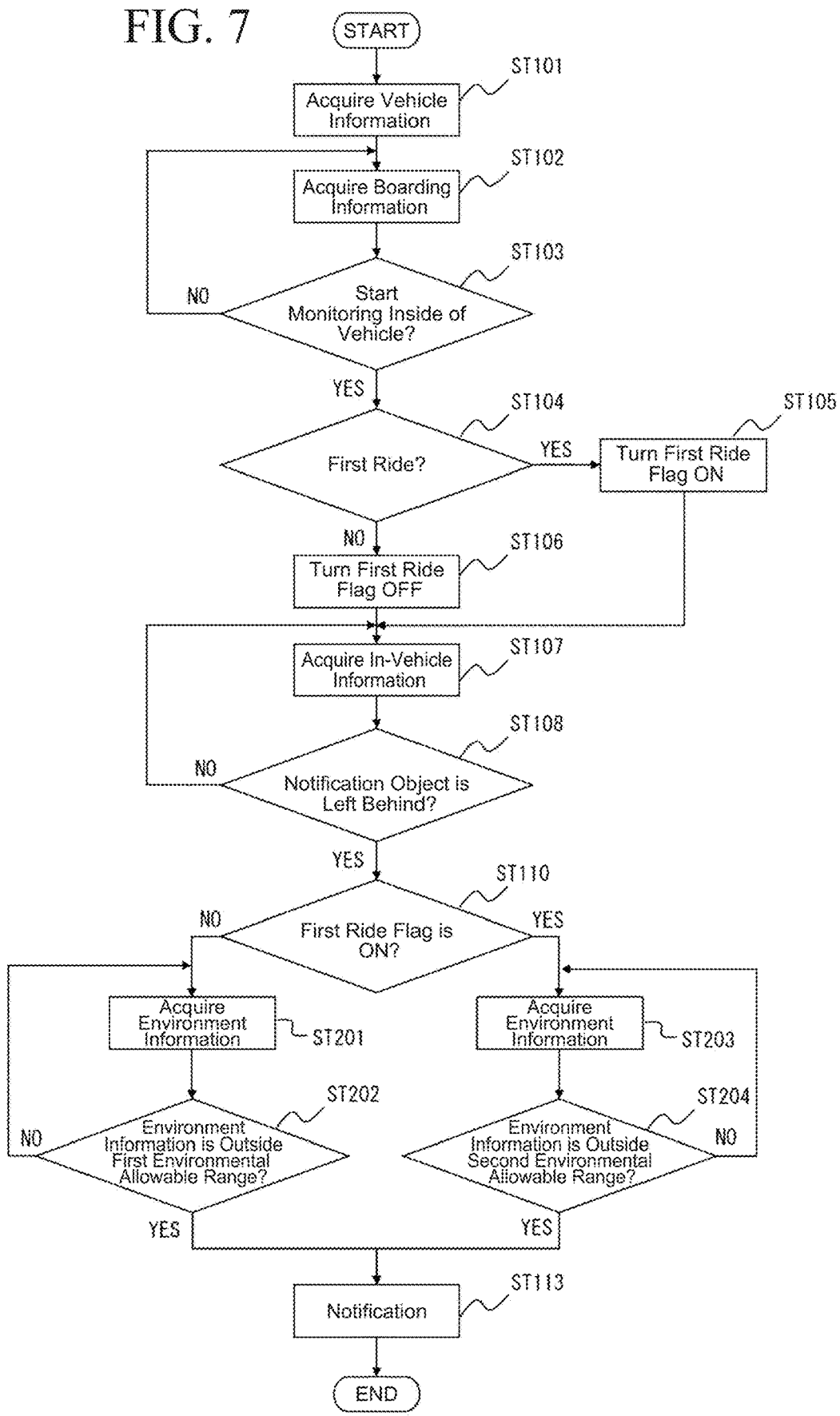
FIG. 7 is a flowchart illustrating an operation example of an in-vehicle monitoring device according to the second embodiment.

Next, an operation of the in-vehicle monitoring device 30 will be described. FIG. 7 is a flowchart illustrating an operation example of the in-vehicle monitoring device 30 according to the second embodiment. Hereinafter, the same steps as those in the process of the in-vehicle monitoring device 10 according to the first embodiment are denoted by the same reference signs as those illustrated in FIG. 4, and description thereof will be omitted or simplified.

The vehicle information acquisition unit 11 acquires vehicle information indicating whether the vehicle 1 is standing (ST101). Then, the in-vehicle information acquisition unit 12 acquires boarding information from the sensor 20 or the vehicle control device 300 (ST102). Next, the notification control unit 31 determines whether to start monitoring the inside of the vehicle using the vehicle information and the boarding information (ST103).

Then, if the notification control unit 31 determines to start monitoring the inside of the vehicle (ST103; YES), the first ride determination unit 15 determines whether the ride of the occupant 2 or the notification object 3 in the vehicle 1 is a first ride (ST104). If the first ride determination unit 15 determines that the ride is a first ride (ST104; YES), the first ride determination unit 15 turns a first ride flag ON (ST105). If the first ride determination unit 15 determines that the ride is not a first ride (ST104; NO), the first ride determination unit 15 turns a first ride flag OFF (ST106). Then, the in-vehicle information acquisition unit 12 acquires in-vehicle information (ST107).

Next, the occupant detection unit 13 and the notification object detection unit 14 detect the occupant 2 in the vehicle and the notification object 3 in the vehicle, respectively, using the in-vehicle information acquired by the in-vehicle information acquisition unit 12. The left-behind determination unit 16 determines whether the notification object 3 is left behind in the vehicle using detection results of the occupant detection unit 13 and the notification object detection unit 14 (ST108). If the left-behind determination unit 16 determines that the notification object 3 is left behind in the vehicle (ST108; YES), the notification control unit 31 refers to whether the first ride flag is ON (ST110), that is, whether the ride of the occupant 2 or the notification object 3 in the vehicle 1 is a first ride.

Then, if the ride of the occupant 2 or the notification object 3 in the vehicle 1 is a first ride, the notification control unit 31 determines necessity of notification using a condition relaxed as compared with a case where the ride of the occupant 2 or the notification object 3 in the vehicle 1 is not a first ride. Hereinafter, an example will be described in which the notification control unit 31 determines necessity of notification using information indicating the temperature inside or outside the vehicle in the environment information.

If the first ride flag is OFF (ST110; NO), that is, if the ride of the occupant 2 or the notification object 3 in the vehicle 1 is not a first ride, the notification control unit 31 acquires environment information from the environment information acquisition unit 32 (ST201), and determines whether the environment information is outside the first environment allowable range (ST202). If the environment information is outside the first environment allowable range (ST202; YES), the notification control unit 31 determines that the first condition is satisfied and notification by notification unit 200 connected to the vehicle 1 is necessary, and causes the notification unit 200 to perform notification (ST113). Here, the first environment allowable range of temperature is, for example, a range of 5° C. or higher and 30° C. or lower. If the environment information is within the first environment allowable range (ST202; NO), the process proceeds to ST201, and the notification control unit 31 acquires the environment information.

Meanwhile, if the first ride flag is ON (ST110; YES), that is, if the ride of the occupant 2 or the notification object 3 in the vehicle 1 is a first ride, the notification control unit 31 acquires environment information from the environment information acquisition unit 32 (ST203), and determines whether the environment information is outside the second environment allowable range (ST204). If the environment information is outside the second environment allowable range (ST203; YES), the notification control unit 31 determines that the second condition is satisfied and notification by notification unit 200 is necessary, and causes the notification unit 200 to perform notification (ST113). Here, the second environment allowable range of temperature is, for example, a range of 0° C. or higher and 35° C. or lower. As described above, in a case where the ride of the occupant 2 or the notification object 3 in the vehicle 1 is a first ride, necessity of notification is determined using a condition relaxed as compared with a case where the ride of the occupant 2 or the notification object 3 in the vehicle 1 is not a first ride.

In a case where the ride of the occupant 2 or the notification object 3 in the vehicle 1 is a first ride, the inside of the vehicle may fall into a harsh environment such as a high temperature inside the vehicle in summer or a low temperature inside the vehicle in winter. However, since the second condition is a condition relaxed as compared with the first condition, that is, the second environment allowable range has a range wider than the first environment allowable range, in a case where the ride of the occupant 2 or the notification object 3 in the vehicle 1 is a first ride, even when the notification object 3 temporarily rides in the vehicle 1 in the harsh environment alone, as in a case where the occupant 2 who is a parent allows a child who is the notification object 3 to be seated on the child safety seat 6, and then the occupant 2 gets in the vehicle 1, the occupant 2 can obtain an extended period before notification is performed. This makes it possible to notify that the notification object 3 is left behind in the vehicle, and to eliminate annoyance and stress due to notification in a case where the notification object 3 temporarily rides in the vehicle 1 in the harsh environment alone unavoidably.

<Modification>

An example has been described in which, in the present embodiment, in a case where the first ride determination unit 15 determines that the ride is not a first ride, if the first condition is satisfied, that is, if the environment information is outside the first environment allowable range, the notification control unit 31 determines that notification is necessary, and in a case where the first ride determination unit 15 determines that the ride is a first ride, if the second condition relaxed as compared with the first condition is satisfied, that is, if the environment information is outside the second environment allowable range having a range wider than the first environment allowable range, the notification control unit 31 determines that notification is necessary.

However, the example of the determination of necessity of notification by the notification control unit 31 is not limited to the above-described example. For example, the notification control unit 31 may determine necessity of notification using time elapsed while the environment information is outside the environment allowable range (hereinafter, referred to as "deviation time"). In this case, in a case where the first ride determination unit 15 determines that the ride is not a first ride, if a set first condition is satisfied, that is, if the deviation time is outside an allowable range, the notification control unit 31 only needs to determine that notification is necessary, and in a case where the first ride determination unit 15 determines that the ride is a first ride, if a second condition relaxed as compared with the first condition is satisfied, that is, if the deviation time is outside an allowable range having a range wider than the allowable range used in the first condition, the notification control unit 31 only needs to determine that notification is necessary. Hereinafter, for the sake of explanation, the allowable range used in the first condition is referred to as a first deviation allowable range, and the allowable range used in the second condition is referred to as a second deviation allowable range. The first deviation allowable range and the second deviation allowable range are collectively referred to as "a deviation allowable range".

Note that the deviation time is time during which a state in which the environment information is outside the environment allowable range continues, and in a case where the environment information temporarily falls within the environment allowable range, it is only required to exclude time during which the environment information is within the environment allowable range from the deviation time, or to reset counting when the environment information falls within the environment allowable range.

Examples of the first deviation allowable range and the second deviation allowable range will be described. The first deviation allowable range is, for example, a range of 0 seconds or more and 5 seconds or less in a case where an upper limit of the allowable deviation time is 5 seconds. Meanwhile, the second deviation allowable range is a range wider than the first deviation allowable range, and for example, a range of 0 seconds or more and 10 seconds or less in a case where an upper limit of the allowable deviation time is 10 seconds. Note that the upper limit of the deviation time in the second deviation allowable range is larger than the upper limit of the deviation time in the first deviation allowable range.

In addition, the notification control unit 31 may count the deviation time in a case where the environment information is outside the first environment allowable range, or may count the deviation time in a case where the environment information is outside the second environment allowable range. Furthermore, in a case where the first ride determination unit 15 determines that the ride is not a first ride, the notification control unit 31 may count the deviation time in a case where the environment information is outside the first environment allowable range, and in a case where the first ride determination unit 15 determines that the ride is a first ride, the notification control unit 31 may count the deviation time in a case where the environment information is outside the second environment allowable range. Hereinafter, an example will be described in which the notification control unit 31 counts the deviation time if the environment information is outside the first environment allowable range in both a case where the first ride determination unit determines that the ride is a first ride and a case where the first ride determination unit 15 determines that the ride is not a first ride. Note that counting of the deviation time may be performed by the notification control unit 31 or may be performed by a calculation unit of the in-vehicle monitoring device 30.

Figure 8:
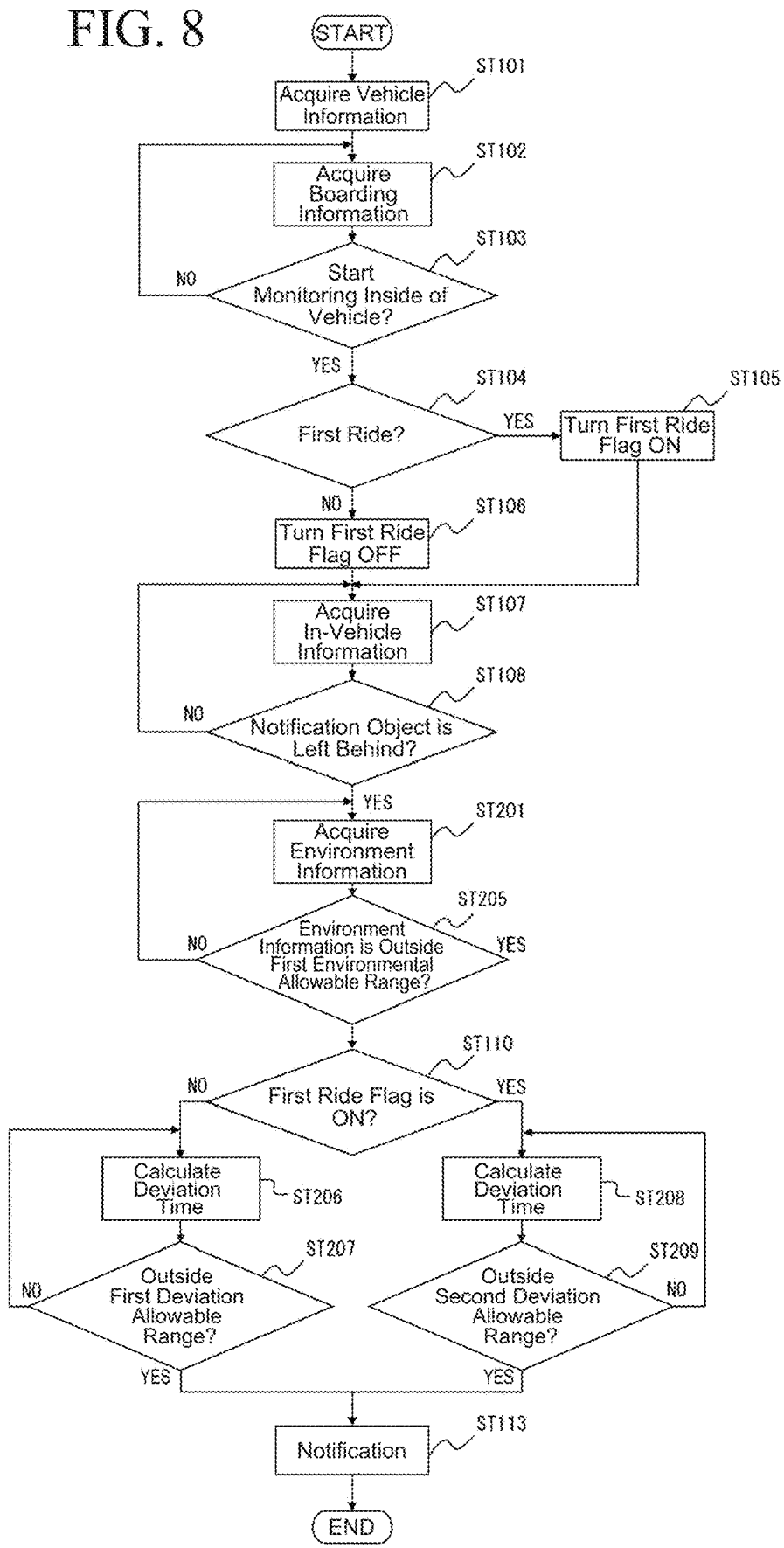
FIG. 8 is a flowchart illustrating an operation example in a modification of the in-vehicle monitoring device according to the second embodiment.

Next, an operation of the in-vehicle monitoring device 30 will be described. FIG. 8 is a flowchart illustrating an operation example in a modification of the in-vehicle monitoring device 30 according to the second embodiment. Hereinafter, the same steps as those in the process of the in-vehicle monitoring device 10 according to the first embodiment are denoted by the same reference signs as those illustrated in FIG. 4, and description thereof will be omitted or simplified.

The vehicle information acquisition unit 11 acquires vehicle information indicating whether the vehicle 1 is standing (ST101). Then, the in-vehicle information acquisition unit 12 acquires boarding information from the sensor 20 or the vehicle control device 300 (ST102). Next, the notification control unit 31 determines whether to start monitoring the inside of the vehicle using the vehicle information and the boarding information (ST103).

Then, if the notification control unit 31 determines to start monitoring the inside of the vehicle (ST103; YES), the first ride determination unit 15 determines whether ride of the occupant 2 or the notification object 3 in the vehicle 1 is a first ride (ST104). If the first ride determination unit 15 determines that the ride is a first ride (ST104; YES), the first ride determination unit 15 turns a first ride flag ON (ST105). If the first ride determination unit 15 determines that the ride is not a first ride (ST104; NO), the first ride determination unit 15 turns a first ride flag OFF (ST106). Then, the in-vehicle information acquisition unit 12 acquires in-vehicle information (ST107).

Next, the occupant detection unit 13 and the notification object detection unit 14 detect the occupant 2 in the vehicle and the notification object 3 in the vehicle, respectively, using the in-vehicle information acquired by the in-vehicle information acquisition unit 12. The left-behind determination unit 16 determines whether the notification object 3 is left behind in the vehicle using detection results of the occupant detection unit 13 and the notification object detection unit 14 (ST108). If the left-behind determination unit 16 determines that the notification object 3 is left behind in the vehicle (ST108; YES), the notification control unit 31 acquires environment information indicating the environment inside or outside the vehicle from the environment information acquisition unit 32 (ST201), and determines whether the environment information is outside the first environment allowable range (ST205). If the environment information is within the first environment allowable range (ST205; NO), the process proceeds to ST201. Meanwhile, if the environment information is outside the first environment allowable range (ST205; YES), the process proceeds to a process to be described next.

If the environment information is outside the first environment allowable range, the notification control unit 31 refers to whether the first ride flag is ON (ST110), that is, whether the ride of the occupant 2 or the notification object 3 in the vehicle 1 is a first ride. Then, if the ride of the occupant 2 or the notification object 3 in the vehicle 1 is a first ride, the notification control unit 31 determines necessity of notification using a condition relaxed as compared with a case where the ride of the occupant 2 or the notification object 3 in the vehicle 1 is not a first ride.

If the first ride flag is OFF (ST110; NO), that is, if the ride of the occupant 2 or the notification object 3 in the vehicle 1 is not a first ride, the notification control unit 31 calculates the deviation time (ST206), and determines whether the deviation time is outside the first deviation allowable range (ST207). If the deviation time is outside the first deviation allowable range (ST207; YES), the notification control unit 31 determines that the first condition is satisfied and notification by notification unit 200 connected to the vehicle 1 is necessary, and causes the notification unit 200 to perform notification (ST113). Meanwhile, if the deviation time is within the first deviation allowable range (ST207; NO), the process proceeds to ST206, and the notification control unit 31 calculates the deviation time.

Meanwhile, if the first ride flag is ON (ST110; YES), that is, if the ride of the occupant 2 or the notification object 3 in the vehicle 1 is a first ride, the notification control unit 31 calculates the deviation time (ST208), and determines whether the deviation time is outside the second deviation allowable range (ST209). If the deviation time is outside the second deviation allowable range (ST209; YES), the notification control unit 31 determines that the second condition is satisfied and notification by notification unit 200 is necessary, and causes the notification unit 200 to perform notification (ST113). Meanwhile, if the deviation time is within the second deviation allowable range (ST209; NO), the process proceeds to ST208, and the notification control unit 31 calculates the deviation time. As described above, in a case where the ride of the occupant 2 or the notification object 3 in the vehicle 1 is a first ride, necessity of notification is determined using a condition relaxed as compared with a case where the ride of the occupant 2 or the notification object 3 in the vehicle 1 is not a first ride.

In a case where the ride of the occupant 2 or the notification object 3 in the vehicle 1 is a first ride, the inside of the vehicle may fall into a harsh environment such as a high temperature inside the vehicle in summer or a low temperature inside the vehicle in winter. However, since the second condition is a condition relaxed as compared with the first condition, that is, the second deviation allowable range has a range wider than the first deviation allowable range, in a case where the ride of the occupant 2 or the notification object 3 in the vehicle 1 is a first ride, an extended period is generated before notification is performed. Therefore, even when the notification object 3 temporarily rides in the vehicle 1 in the harsh environment alone, as in a case where the occupant 2 who is a parent allows a child to be seated on the child safety seat 6, and then the occupant 2 gets in the vehicle 1, the occupant 2 can obtain an extended period before notification is performed. This makes it possible to notify that the notification object 3 is left behind in the vehicle, and to eliminate annoyance and stress due to notification in a case where the notification object 3 temporarily rides in the vehicle 1 in the harsh environment alone unavoidably.

Note that an example has been described in which, in the present embodiment, the environment information is information indicating the temperature inside or outside the vehicle, and the notification control unit 31 uses the temperature for determination of necessity of notification. However, the environment information used for determination of necessity of notification is not limited to the temperature. The environment information is a temperature, a carbon monoxide concentration, a carbon dioxide concentration, or the like inside or outside the vehicle, and the environment information used for determination of necessity of notification can be selected from the temperature, the carbon monoxide concentration, and the carbon dioxide concentration inside or outside the vehicle. For example, the notification control unit 31 may determine that notification is necessary if at least one of the temperature, the carbon monoxide concentration, and the carbon dioxide concentration inside or outside the vehicle is outside the environment allowable range. Also in this case, the notification control unit 31 only needs to use the first environment allowable range for determination of necessity of notification if the ride is not a first ride, and only needs to use the second environment allowable range having a range wider than the first environment allowable range for determination of necessity of notification if the ride is a first ride.

In the present embodiment, the humidity inside or outside the vehicle may be further acquired from the environment sensor 23 such as a hygrometer and used for determination of necessity of notification. In this case, the environment information acquisition unit 32 calculates a wet bulb globe temperature (WBGT) inside or outside the vehicle using the temperature and the humidity acquired from the environment sensor 23. Then, the notification control unit 31 acquires the WBGT as the environment information, and determines that notification is necessary if the WBGT is outside the environment allowable range. This can prevent the notification object 3 left behind in the vehicle from falling into suffering heat stroke. Also in this case, the notification control unit 31 only needs to use the first environment allowable range for determination of necessity of notification if the ride is not a first ride, and may use the second environment allowable range having a range wider than the first environment allowable range for determination of necessity of notification if the ride is a first ride. Note that the calculation of the WBGT may be performed by the environment information acquisition unit 32, or may be performed by the calculation unit (not illustrated) included in the in-vehicle monitoring device 30.

In the present embodiment, in addition to determining necessity of notification depending on whether the environment information is outside the environment allowable range, the notification control unit 31 may determine necessity of notification depending on whether the elapsed time is outside the time allowable range by acquiring the elapsed time from the left-behind determination unit 16 as in the first embodiment. In this case, by determining necessity of notification using the elapsed time and the environment information, the notification control unit 31 only needs to determine that notification is necessary if either the elapsed time or the environment information is outside the time allowable range or the environment allowable range. That is, in a case where the ride is not a first ride, if the elapsed time is outside the first time allowable range or the environment information is outside the first environment allowable range, the notification control unit 31 only needs to determine that the first condition is satisfied and notification is necessary, and in a case where the ride is a first ride, if the elapsed time is outside the second time allowable range or the environment information is outside the second environment allowable range, the notification control unit 31 only needs to determine that the second condition is satisfied and notification is necessary. In this way, the notification control unit 31 can determine that notification is necessary even in a case where one of the elapsed time and the environment information does not deviate from the time allowable range or the environment allowable range and the other of the elapsed time and the environment information deviates from the time allowable range or the environment allowable range, and therefore safety of the notification object 3 left behind in the vehicle can be ensured.

Third Embodiment

As in the first embodiment, an in-vehicle monitoring device 50 according to a third embodiment includes: an in-vehicle information acquisition unit 12 that acquires in-vehicle information from a sensor 20; an occupant detection unit 13 that detects an occupant 2 in a vehicle; a notification object detection unit 14 that detects a notification object 3 in the vehicle; a first ride determination unit 15 that determines whether ride of the occupant 2 or the notification object 3 in a vehicle 1 is a first ride; a left-behind determination unit 16 that determines whether the notification object 3 is left behind in the vehicle; and a notification control unit 51 that determines necessity of notification. The present embodiment is different from the first embodiment in that a method in which the notification control unit 51 causes a notification unit 200 to perform notification is different between a case of a first ride and a case of not a first ride. The same components as those in the first embodiment are denoted by the same reference signs, and description thereof will be omitted.

Figure 9:
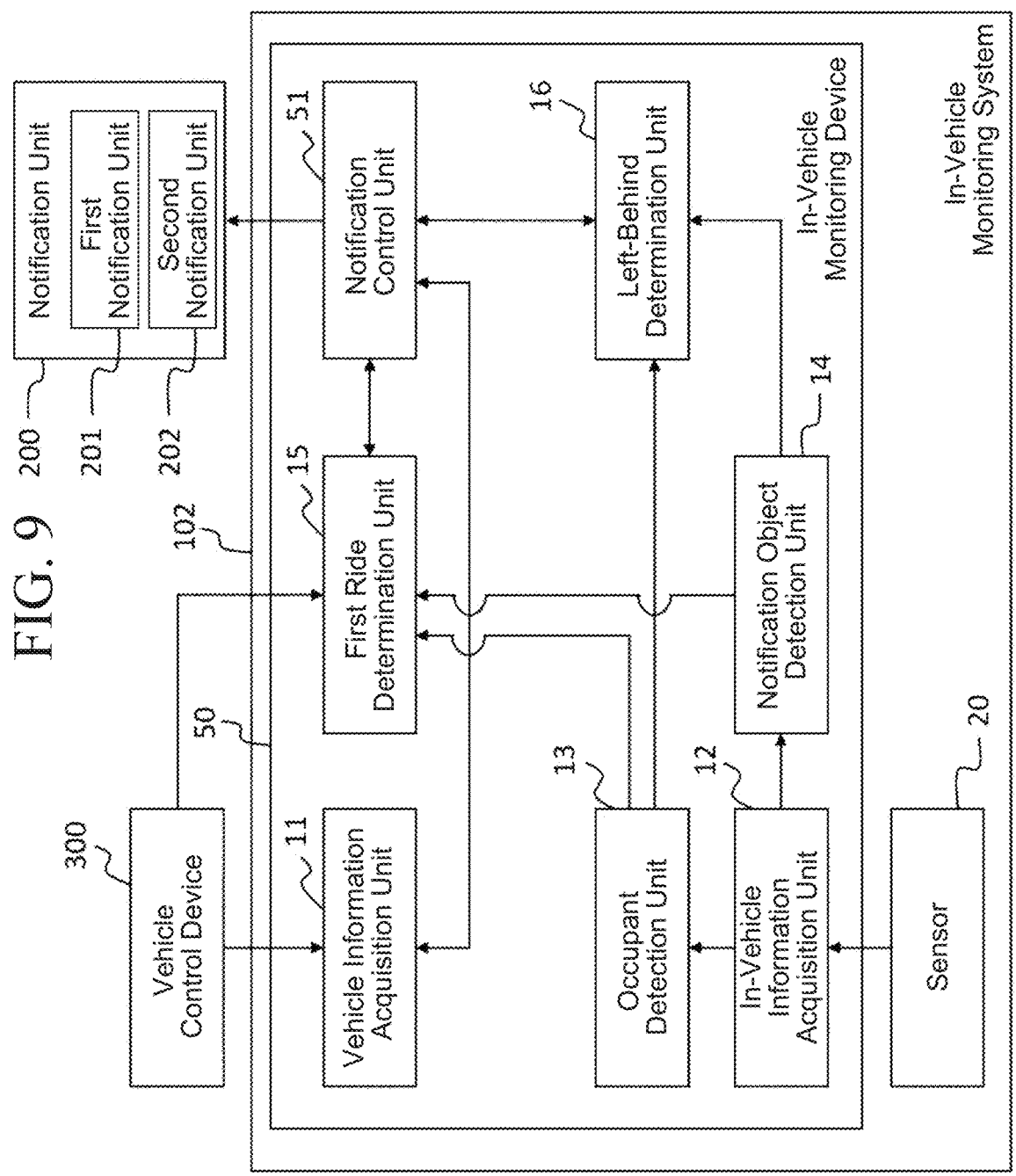
FIG. 9 is a block diagram illustrating a configuration example of an in-vehicle monitoring system according to a third embodiment.

FIG. 9 is a block diagram illustrating a configuration example of an in-vehicle monitoring system 102 according to the third embodiment. In the present embodiment, the notification unit 200 connected to the vehicle 1 includes a first notification unit 201 and a second notification unit 202. The first notification unit 201 is, for example, a hazard lamp mounted on the vehicle 1 or a mobile terminal carried by the occupant 2 boarding the vehicle 1. The second notification unit 202 is a horn or the like mounted on the vehicle 1, and can perform notification at least by sound.

The notification control unit 51 causes the notification unit 200 including the first notification unit 201 and the second notification unit 202 connected to the vehicle 1 to perform notification. For example, if the first notification unit 201 is a hazard lamp, the first notification unit 201 is caused to perform notification to the outside of the vehicle by being turned on, and if the first notification unit 201 is a mobile terminal, the first notification unit 201 is caused to perform notification by display, for example, by being caused to perform notification by display of a notice. For example, if the second notification unit 202 is a horn mounted on the vehicle 1, the second notification unit 202 issues an alarm and performs notification to the outside of the vehicle by sound. Note that if the first notification unit 201 is a mobile terminal, the notification control unit 51 may cause the first notification unit 201 to perform notification by vibrating the first notification unit 201. As described above, the second notification unit 202 performs notification emphasized so as to attract attention of the occupant 2 or a person outside the vehicle as compared with the first notification unit 201. Hereinafter, for the sake of explanation, notification by the first notification unit 201 is referred to as first notification, and notification by the second notification unit 202 is referred to as second notification.

Determination of necessity of notification by the notification control unit 51 will be described. Hereinafter, an example will be described in which the notification control unit 51 acquires elapsed time from the left-behind determination unit 16 and determines necessity of notification on the basis of whether the elapsed time is outside an allowable range. In a case where the ride of the occupant 2 or the notification object 3 in the vehicle 1 is not a first ride, the notification control unit 51 determines that notification from the second notification unit 202 of the notification unit 200 is necessary if the set first condition is satisfied, that is, if the elapsed time is outside the first time allowable range. Meanwhile, in a case where the ride of the occupant 2 or the notification object 3 in the vehicle 1 is a first ride, the notification control unit 51 determines that notification from the first notification unit 201 included in the notification unit 200 is necessary if the first condition is satisfied, that is, if the elapsed time is outside the first time allowable range, and further determines that notification from the second notification unit 202 included in the notification unit 200 is necessary if the second condition is satisfied.

Although details will be described below, since the second time allowable range has a range wider than the first time allowable range, in a case where the ride of the occupant 2 or the notification object 3 in the vehicle 1 is a first ride, the notification control unit 51 causes the notification unit 200 to perform the first notification and then causes the notification unit 200 to perform the second notification. Here, in a case where the notification control unit 51 causes it to perform the first notification and the second notification, if the first notification is notification by display, such as turning on a hazard lamp, the second notification is notification by sound, such as an alarm from a horn, and the second notification is notification emphasized as compared with the first notification, the occupant 2 can recognize that the notification object 3 is left behind in the vehicle without feeling annoyance and stress when the first notification is issued, and can attempt to eliminate the left-behind state before the second notification that attracts more attention is performed.

Figure 10:
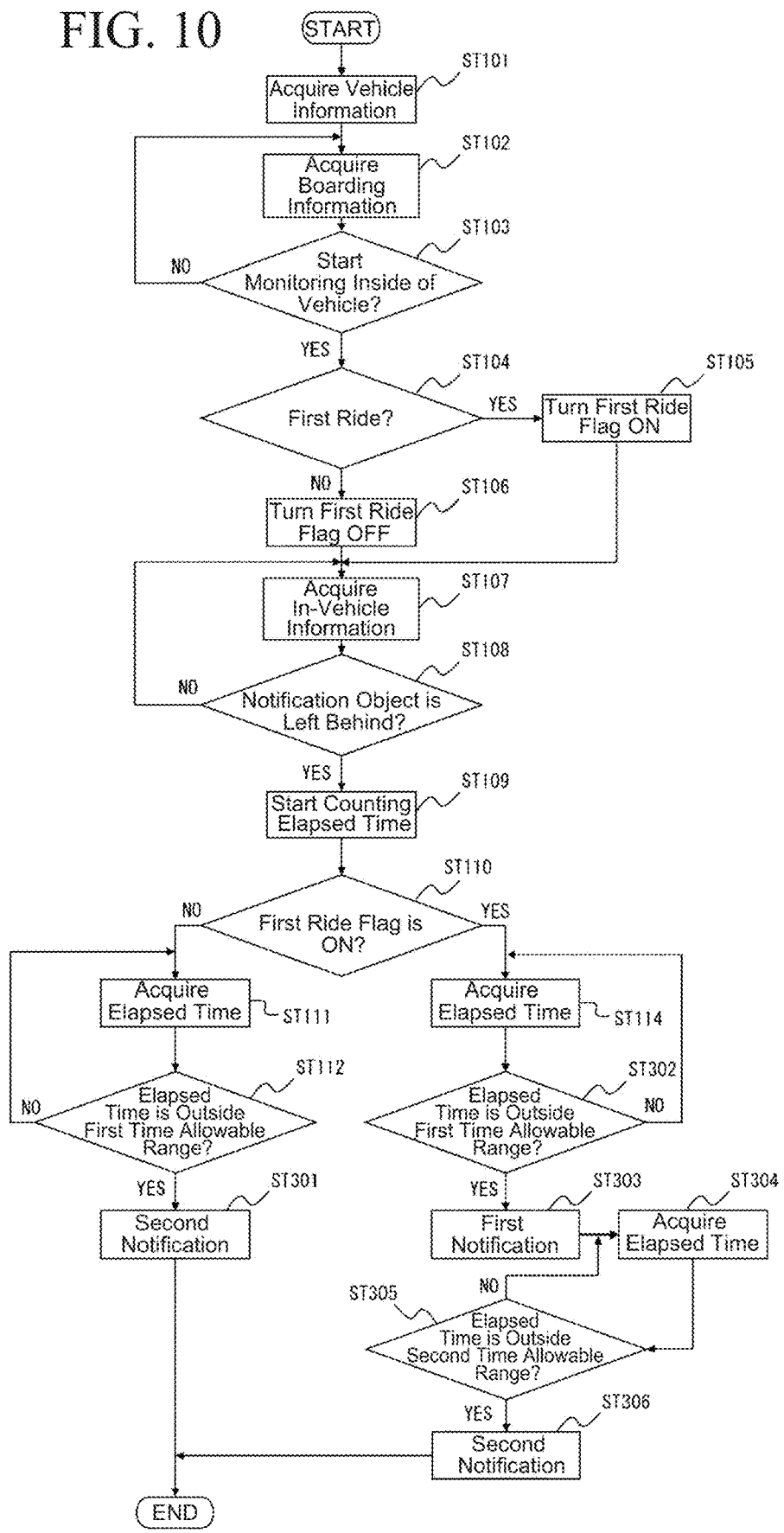
FIG. 10 is a flowchart illustrating an operation example of an in-vehicle monitoring device according to the third embodiment.

Next, an operation of the in-vehicle monitoring device 50 will be described. FIG. 10 is a flowchart illustrating an example of the operation of the in-vehicle monitoring device 50 according to the third embodiment. The same steps as those in the process of the in-vehicle monitoring device 10 according to the first embodiment are denoted by the same reference signs as those illustrated in FIG. 4, and description thereof will be omitted or simplified.

The vehicle information acquisition unit 11 acquires vehicle information indicating whether the vehicle 1 is standing (ST101). Then, the in-vehicle information acquisition unit 12 acquires boarding information from the sensor 20 or the vehicle control device 300 (ST102). Next, the notification control unit 51 determines whether to start monitoring the inside of the vehicle using the vehicle information and the boarding information (ST103).

Then, if the notification control unit 51 determines to start monitoring the inside of the vehicle (ST103; YES), the first ride determination unit 15 determines whether the ride of the occupant 2 or the notification object 3 in the vehicle 1 is a first ride (ST104), and turns a first ride flag ON (ST105) if the ride is a first ride (ST104; YES). Meanwhile, if the ride of the occupant 2 or the notification object 3 in the vehicle 1 is not a first ride (ST104; NO), the first ride determination unit 15 turns a first ride flag OFF (ST106). Then, the in-vehicle information acquisition unit 12 acquires in-vehicle information (ST107).

Next, the occupant detection unit 13 and the notification object detection unit 14 detect the occupant 2 in the vehicle and the notification object 3 in the vehicle, respectively, using the in-vehicle information acquired by the in-vehicle information acquisition unit 12. The left-behind determination unit 16 determines whether the notification object 3 is left behind in the vehicle using detection results of the occupant detection unit 13 and the notification object detection unit 14 (ST108). If the left-behind determination unit 16 determines that the notification object 3 is left behind in the vehicle (ST108; YES), the left-behind determination unit 16 starts counting of the elapsed time (ST109). Then, the notification control unit 51 refers to whether the first ride flag is ON (ST110), that is, whether the ride of the occupant 2 or the notification object 3 in the vehicle 1 is a first ride or the ride of the occupant 2 or the notification object 3 in the vehicle 1 is not a first ride.

If the first ride flag is OFF (ST110; NO), the notification control unit 51 acquires elapsed time from the left-behind determination unit 16 (ST111), and determines whether the elapsed time is outside the first time allowable range (ST112). Then, if the elapsed time is within the first time allowable range (ST112; NO), the process proceeds to ST111, and the notification control unit 51 acquires the elapsed time. If the elapsed time is outside the first time allowable range (ST112; YES), the notification control unit 51 determines that the first condition is satisfied and the second notification by the second notification unit 202 included in the notification unit 200 connected to the vehicle 1 is necessary, and causes the second notification unit 202 to perform the second notification (ST301). Here, in the process of ST301, the notification control unit 51 may cause both the first notification unit 201 and the second notification unit 202 included in the notification unit 200 to perform notification.

Meanwhile, if the first ride flag is ON (ST110; YES), the notification control unit 51 acquires elapsed time from the left-behind determination unit 16 (ST114), and determines whether the elapsed time is outside the first time allowable range (ST302). Then, if the elapsed time is within the first time allowable range (ST302; NO), the process proceeds to ST114, and the notification control unit 51 acquires the elapsed time. If the elapsed time is outside the first time allowable range (ST302; YES), the notification control unit 51 determines that the first condition is satisfied and the first notification by the first notification unit 201 included in the notification unit 200 is necessary, and causes the first notification unit 201 to perform the first notification (ST303).

Next, the notification control unit 51 acquires elapsed time (ST304), and determines whether the elapsed time is outside the second time allowable range having a range wider than the first time allowable range (ST305). Here, in the processes of ST112 and ST305, the notification control unit 51 determines whether to cause the second notification to be performed using the first time allowable range and the second time allowable range, respectively. Since the second time allowable range has a range wider than the first time allowable range, in a case where the ride of the occupant 2 or the notification object 3 in the vehicle 1 is a first ride, the occupant 2 can obtain a longer extended period before the second notification is performed than in a case where the ride of the occupant 2 or the notification object 3 in the vehicle 1 is not a first ride. The first notification may be ended before the process proceeds to ST305, but it is preferable to continue the first notification at least until the process proceeds to a process of the second notification described later. In this way, the occupant 2 who has recognized the first notification can recognize that the notification object 3 is left behind before the second notification that attracts more attention than the first notification is performed, and can eliminate the left-behind state.

If the elapsed time is within the second time allowable range (ST305; NO), the process proceeds to ST304, and the notification control unit 51 acquires the elapsed time. If the elapsed time is outside the second time allowable range (ST305; YES), the notification control unit 51 determines that the second condition is satisfied and the second notification by the second notification unit 202 included in the notification unit 200 is necessary, and causes the second notification unit 202 to perform the second notification (ST306).

Here, since the second time allowable range has a range wider than the first time allowable range, the occupant 2 can obtain an extended period from the time when the first notification is performed to the time when the second notification is performed in a time difference between the first time allowable range and the second time allowable range. In addition, if the first notification is notification by display, the first notification is not a notification method in which the occupant 2 is surprised, such as sudden issue of an alarm, and therefore an influence on a change in emotion of the occupant 2 is small, and annoyance and stress caused by notification can be eliminated.

Note that, as an operation example of the in-vehicle monitoring device 50, in the above description, an example has been described in which the notification control unit 51 determines necessity of notification using the elapsed time, but the necessity of notification may be determined using environment information as in the second embodiment. In this case, in a case where the ride of the occupant 2 or the notification object 3 in the vehicle 1 is not a first ride, the notification control unit 51 determines that notification from the second notification unit 202 of the notification unit 200 is necessary if the first condition is satisfied, that is, if the environment information is outside the first environment allowable range, and meanwhile, in a case where the ride of the occupant 2 or the notification object 3 in the vehicle 1 is a first ride, the notification control unit 51 determines that notification from the first notification unit 201 included in the notification unit 200 is necessary if the first condition is satisfied, that is, if the environment information is outside the first environment allowable range, and further determines that notification from the second notification unit 202 included in the notification unit 200 is necessary if the second condition is satisfied, that is, if the environment information is outside the second environment allowable range.

In addition, as in the second embodiment, necessity of notification may be determined using the deviation time. In this case, in a case where the ride of the occupant 2 or the notification object 3 in the vehicle 1 is not a first ride, the notification control unit 51 determines that notification from the second notification unit 202 of the notification unit 200 is necessary if the first condition is satisfied, that is, if the deviation time is outside the first deviation allowable range, and meanwhile, in a case where the ride of the occupant 2 or the notification object 3 in the vehicle 1 is a first ride, the notification control unit 51 determines that notification from the first notification unit 201 included in the notification unit 200 is necessary if the first condition is satisfied, that is, if the deviation time is outside the first deviation allowable range, and further determines that notification from the second notification unit 202 included in the notification unit 200 is necessary if the second condition is satisfied, that is, if the deviation time is outside the second deviation allowable range.

In addition, the notification control unit 51 may determine necessity of notification using both the elapsed time and the environment information. In a case where the notification control unit 51 determines necessity of notification using the elapsed time and the environment information, the notification control unit 51 only needs to determine necessity of notification on the basis of whether the elapsed time and the environment information are outside the time allowable range and outside the environment allowable range, respectively. FIG. 11 is an explanatory diagram illustrating an operation example of the notification control unit 51 according to the third embodiment. FIG. 11 illustrates a correspondence diagram between determination of necessity of notification by the notification control unit 51 and a notification method in a case where the ride of the occupant 2 or the notification object 3 in the vehicle 1 is a first ride. As illustrated in the example of FIG. 11, for example, in a case where the ride is a first ride, the notification control unit 51 determines whether the elapsed time is outside the first time allowable range or whether the elapsed time is outside the second time allowable range, and determines whether the environment information is outside the first environment allowable range or whether the environment information is outside the second environment allowable range. When the notification unit 200 performs notification by a notification method that varies depending on each of the determination results, the occupant 2 can grasp the current situation in the vehicle by recognizing the notification from the notification unit 200.

Note that FIG. 11 illustrates an example in which, in a case where the elapsed time is outside the first time allowable range and within the second time allowable range, and the environment information is outside the first environment allowable range and within the second environment allowable range, the notification control unit 51 determines that the first notification is necessary, in a case where the elapsed time is outside the first time allowable range and within the second time allowable range, and the environment information is outside the second environment allowable range, and in a case where the elapsed time is outside the second time allowable range, and the environment information is outside the first environment allowable range and within the second environment allowable range, the notification control unit 51 determines that the second notification is necessary, and in a case where the elapsed time is outside the second time allowable range, and the environment information is outside the second environment allowable range, the notification control unit 51 determines that both the first notification and the second notification are necessary.

As described above, in a case where the ride of the occupant 2 or the notification object 3 in the vehicle 1 is not a first ride, if the elapsed time or the environment information is outside the first time allowable range or outside the first environment allowable range, the notification control unit 51 determines that the first condition is satisfied and the second notification is necessary. In a case where the ride of the occupant 2 or the notification object 3 in the vehicle 1 is a first ride, if the elapsed time or the environment information is outside the first time allowable range or outside the first environment allowable range, the notification control unit 51 determines that the first condition is satisfied and the first notification is necessary, and if the elapsed time or the environment information is outside the second time allowable range or outside the second environment allowable range, the notification control unit 51 determines that the second condition is satisfied and the second notification is necessary. Therefore, in a case where the ride of the occupant 2 or the notification object 3 in the vehicle 1 is a first ride, the occupant 2 can obtain an extended period before the second notification that is a notification method emphasized as compared with the first notification is performed, and it possible to notify that the notification object 3 is left behind in the vehicle, and to eliminate annoyance and stress due to notification in a case where the notification object 3 temporarily rides in the vehicle 1 alone unavoidably.

In addition, an example has been described in which, in the present embodiment, in a case where the ride of the occupant 2 or the notification object 3 in the vehicle 1 is not a first ride, the notification control unit 51 determines that the second notification is necessary if the first condition is satisfied, and in a case where the ride of the occupant 2 or the notification object 3 in the vehicle 1 is a first ride, the notification control unit 51 determines that the first notification is necessary if the first condition is satisfied. In the above description, the notification control unit 51 determines necessity of notification using the first condition regardless of whether the ride of the occupant 2 or the notification object 3 in the vehicle 1 is a first ride. However, in a case where the ride of the occupant 2 or the notification object 3 in the vehicle 1 is a first ride, the notification control unit 51 may determine necessity of notification using a condition different from the first condition instead of the first condition. In this case, a third condition only needs to be a condition harsher than the second condition.

The third condition being more harsher than the second condition means that a third time allowable range has a range narrower than the second time allowable range, for example, in a case where the notification control unit 51 determines necessity of notification using the time allowable range. In addition, the third condition being more harsher than the second condition means that a third environment allowable range has a range narrower than the second environment allowable range, for example, in a case where the notification control unit 51 determines necessity of notification using the environment allowable range. Furthermore, the third condition being more harsher than the second condition means that a third deviation allowable range has a range narrower than the second deviation allowable range, for example, in a case where the notification control unit 51 determines necessity of notification using the deviation allowable range.

In addition, the third condition is preferably a condition relaxed as compared with the first condition, that is, the third time allowable range preferably has a range wider than the first time allowable range, the third environment allowable range preferably has a range wider than the first environment allowable range, and the third deviation allowable range preferably has a range wider than the first deviation allowable range. In this way, the third condition is relaxed as compared with the first condition, the occupant 2 can obtain an extended period in a time and an environment before the second notification is performed in a case where the ride of the occupant 2 or the notification object 3 in the vehicle 1 is a first ride, and it possible to notify that the notification object 3 is left behind in the vehicle, and to eliminate annoyance and stress due to notification in a case where the notification object 3 temporarily rides in the vehicle 1 alone unavoidably.

An example of determination of necessity of notification by the notification control unit 51 in a case where the ride of the occupant 2 or the notification object 3 in the vehicle 1 is a first ride will be described. In a case where the ride of the occupant 2 or the notification object 3 in the vehicle 1 is a first ride, the notification control unit 51 may determine that notification from the first notification unit 201 included in the notification unit 200 is necessary if the third condition is satisfied instead of the first condition, that is, if the elapsed time is outside the third time allowable range, and may further determine that notification from the second notification unit 202 included in the notification unit 200 is necessary if the second condition is satisfied, that is, if the elapsed time is outside the second time allowable range.

Meanwhile, in a case where the notification control unit 51 determines necessity of notification using the environment information, similarly, in a case where the ride of the occupant 2 or the notification object 3 in the vehicle 1 is a first ride, the notification control unit 51 only needs to determine that notification from the first notification unit 201 included in the notification unit 200 is necessary if the third condition is satisfied instead of the first condition, that is, if the environment information is outside the third environment allowable range, and only needs to further determine that notification from the second notification unit 202 included in the notification unit 200 is necessary if the second condition is satisfied, that is, if the environment information is outside the second environment allowable range.

Furthermore, in a case where the notification control unit 51 determines necessity of notification using the deviation time, similarly, in a case where the ride of the occupant 2 or the notification object 3 in the vehicle 1 is a first ride, the notification control unit 51 only needs to determine that notification from the first notification unit 201 included in the notification unit 200 is necessary if the third condition is satisfied instead of the first condition, that is, if the deviation time is outside the third deviation allowable range, and only needs to further determine that notification from the second notification unit 202 included in the notification unit 200 is necessary if the second condition is satisfied, that is, if the deviation time is outside the second deviation allowable range.

Note that an example has been described in which, in the present embodiment, the first notification is notification by display and the second notification is notification by sound. However, it is not limited to the above example as long as the second notification is a notification method emphasized as compared with the first notification. For example, the first notification unit 201 and the second notification unit 202 may both be horns mounted on the vehicle 1, and each of the first notification and the second notification may be notification by an alarm of the horn. In this case, for example, the notification control unit 51 only needs to make an alarm pattern different between the first notification and the second notification, or only needs to make an alarm volume different between the first notification and the second notification.

Note that an example has been described in which, in the first to third embodiments, annoyance and stress due to notification can be eliminated in a use case where the occupant 2 who is a parent allows a child who is the notification object 3 to be seated on the child safety seat 6, and then the occupant 2 gets in the vehicle 1 and sits on the seat at the time of getting on the vehicle. However, at the time of getting out of the vehicle, similarly, annoyance and stress due to notification can be eliminated by the in-vehicle monitoring device. As described above, in a case where an action of allowing a child to be seated on the child safety seat 6 at the time of a first ride occurs, at the time of getting out of the vehicle, a use case occurs in which the occupant 2 who is a parent gets out of the vehicle and removes the child who is the notification object 3 from the child safety seat 6. For example, as described in the first embodiment, in a case where the ride of the occupant 2 or the notification object 3 in the vehicle 1 is a first ride, if the notification control unit determines necessity of notification on the basis of whether the elapsed time is outside the second time allowable range having a range wider than the first time allowable range, the occupant 2 has a longer extended period from the time when the occupant 2 gets out of the vehicle to the notification as compared with a case where the ride of the occupant 2 or the notification object 3 in the vehicle 1 is not a first ride. As described above, in a case where the ride of the occupant 2 or the notification object 3 in the vehicle 1 is a first ride, if the notification control unit determines necessity of notification using a condition relaxed as compared with a case where the ride is not a first ride, it is possible to notify that the notification object 3 is left behind in the vehicle, and to eliminate annoyance and stress due to notification in a case where the notification object 3 temporarily rides in the vehicle 1 alone unavoidably.

In addition, an example has been described in which, in the first to third embodiments, the first ride determination unit 15 determines whether the ride is a first ride on the basis of whether the stop time of the vehicle 1 is equal to or longer than the set time. However, in a case where the first ride determination unit 15 determines whether the ride is a first ride on the basis of whether the stop time of the vehicle 1 is equal to or longer than the set time, the first ride determination unit 15 may determine not only whether the ride is a first ride but also a possibility that the ride of the occupant 2 or the notification object 3 in the vehicle 1 is a first ride. For example, a plurality of set times to be used by the first ride determination unit 15 for comparison with the stop time may be provided, and it may be determined that the possibility of the first ride is high if the stop time exceeds each of the plurality of set times. As the possibility of the first ride increases, that is, as the stop time of the vehicle 1 increases, a condition related to determination of necessity of notification by the notification control unit may be relaxed gradually.

In addition, the embodiments disclosed in the present specification can be freely combined with each other within the scope thereof, and the embodiments can be appropriately modified or omitted.

REFERENCE SIGNS LIST

1: Vehicle, 2: Occupant, 3: Notification object, 4: Front seat, 5: Rear seat, 6: Child safety seat, 7: Trunk, 10, 30, and 50: In-vehicle monitoring device, 10a: Processing circuitry, 10b: Processor, 10c: Memory, 11: Vehicle information acquisition unit, 12: In-vehicle information acquisition unit, 13: Occupant detection unit, 14: Notification object detection unit, 15: First ride determination unit, 16: Left-behind determination unit, 17, 31, and 51: Notification control unit, 20: Sensor, 21: Imaging device, 21A and 22A: Detection range, 22: Radio wave sensor, 23: Environment sensor, 100, 101, and 102: In-vehicle monitoring system, 200: Notification unit, 201: First notification unit, 202: Second notification unit, 300: Vehicle control device

The invention claimed is:

1. An in-vehicle monitoring device comprising:
processing circuitry
to acquire in-vehicle information indicating a situation in a vehicle from a sensor that detects any object in the vehicle,
to detect an occupant as the any object in the vehicle using the acquired in-vehicle information,
to detect a notification object as the any object in the vehicle using the acquired in-vehicle information,
to determine whether ride of the occupant or the notification object in the vehicle is a first ride,
to determine whether the notification object is left behind in the vehicle using detection results,
in a case where the processing circuitry determines that the notification object is left behind,
  in a case where the processing circuitry determines that the ride is not a first ride, to determine that notification is necessary if a set first condition is satisfied, and
  in a case where the processing circuitry determines that the ride is a first ride, to determine necessity of notification using a second condition that is satisfied, wherein the second condition is relaxed as compared with the first condition, and
in a case where the processing circuitry determines necessity of the notification, to control a device of the vehicle, wherein
the processing circuitry determines whether the ride of the occupant or the notification object in the vehicle is a first ride, based on whether the occupant or the notification object enters the vehicle in a state in which both the occupant and the notification object are not present in the vehicle.

2. The in-vehicle monitoring device according to claim 1, wherein
the processing circuitry acquires elapsed time during which the notification object is left behind in the vehicle,
in a case where the processing circuitry determines that the ride is not a first ride, the processing circuitry determines that the first condition is satisfied and notification is necessary if the elapsed time is outside a first time allowable range, and
in a case where the processing circuitry determines that the ride is a first ride, the processing circuitry determines that the second condition is satisfied and notification is necessary if the elapsed time is outside a second time allowable range having a range wider than the first time allowable range.

3. The in-vehicle monitoring device according to claim 1, where the processing circuitry acquires environment information indicating an environment inside or outside the vehicle from an environment sensor that detects the environment inside or outside the vehicle, and acquires the environment information, in a case where the processing circuitry determines that the ride is not a first ride, the processing circuitry determines that the first condition is satisfied and notification is necessary if the environment information is outside a first environment allowable range, and in a case where the processing circuitry determines that the ride is a first ride, the processing circuitry determines that the second condition is satisfied and notification is necessary if the environment information is outside a second environment allowable range having a range wider than the first environment allowable range.

4. The in-vehicle monitoring device according to claim 3, wherein the processing circuitry acquires at least one of a temperature, a carbon monoxide concentration, and a carbon dioxide concentration inside or outside the vehicle as the environment information from the environment sensor, in a case where the processing circuitry determines that the ride is not a first ride, the processing circuitry determines that the first condition is satisfied and notification is necessary if at least one of the temperature, the carbon monoxide concentration, and the carbon dioxide concentration inside or outside the vehicle is outside the first environment allowable range, and in a case where the processing circuitry determines that the ride is a first ride, the processing circuitry determines that the second condition is satisfied and notification is necessary if at least one of the temperature, the carbon monoxide concentration, and the carbon dioxide concentration inside or outside the vehicle is outside the second environment allowable range.

5. The in-vehicle monitoring device according to claim 3, wherein the processing circuitry acquires elapsed time during which a notification object is left behind in the vehicle in addition to acquiring the environment information, in a case where the processing circuitry determines that the ride is not a first ride, the processing circuitry determines that the first condition is satisfied and notification is necessary if the elapsed time is outside a first time allowable range or the environment information is outside the first environment allowable range, and in a case where the processing circuitry determines that the ride is a first ride, the processing circuitry determines that the second condition is satisfied and notification is necessary if the elapsed time is outside a second time allowable range having a range wider than the first time allowable range or the environment information is outside the second environment allowable range.

6. The in-vehicle monitoring device according to claim 1, wherein the processing circuitry acquires environment information indicating an environment inside or outside the vehicle from an environment sensor that detects the environment inside or outside the vehicle, wherein the processing circuitry acquires the environment information, in a case where the processing circuitry determines that the ride is not a first ride, the processing circuitry determines that the first condition is satisfied and notification is necessary if deviation time during which the environment information is outside an environment allowable range is outside a first deviation allowable range, and in a case where the processing circuit determines that the ride is a first ride, the processing circuitry determines that the second condition is satisfied and notification is necessary if the deviation time is outside a second deviation allowable range having a range wider than the first deviation allowable range.

7. The in-vehicle monitoring device according to claim 1, wherein the processing circuitry determines necessity of first notification and necessity of second notification which is a notification method emphasized as compared with the first notification, in a case where the processing circuitry determines that the ride is not a first ride, the processing circuitry determines that the second notification is necessary if the first condition is satisfied, and in a case where the processing circuitry determines that the ride is a first ride, the processing circuitry determines that the first notification is necessary if the first condition used in a case where the processing circuitry determines that the ride is not a first ride is satisfied, and determines that the second notification is necessary if the second condition is satisfied.

8. The in-vehicle monitoring device according to claim 7, wherein in a case where the ride is a first ride, the processing circuitry determines necessity of the first notification using a third condition which is different from the first condition and more severe than the second condition instead of the first condition, and determines that the first notification is necessary if the third condition is satisfied and determines that the second notification is necessary if the second condition is satisfied.

9. The in-vehicle monitoring device according to claim 7, wherein the first notification includes notification by at least display or vibration, and the second notification includes notification by at least sound.

10. The in-vehicle monitoring device according to claim 7, wherein in a case where the processing circuitry determines that each of the first notification and the second notification is necessary, the processing circuitry causes it to continuously perform the first notification until the second notification is performed.

11. The in-vehicle monitoring device according to claim 1, wherein the sensor includes: an imaging device mounted on the vehicle and adapted to acquire an image obtained by imaging an inside of the vehicle; and a radio wave sensor mounted on the vehicle and adapted to acquire distance data obtained by measuring a distance to an object in the vehicle, the processing circuitry acquires the obtained image and the distance data as the in-vehicle information from the imaging device and the radio wave sensor, respectively, the processing circuitry detects the occupant in the vehicle using at least one of the obtained image and the distance data, and the processing circuitry detects the notification object in the vehicle using at least one of the obtained image and the distance data.

12. The in-vehicle monitoring device according to claim 1, wherein the sensor includes a voice sensor mounted on the vehicle and adapted to acquire voice in the vehicle,
the processing circuitry acquires the voice from the voice sensor as the in-vehicle information, and
the processing circuitry determines whether the acquired voice has been uttered from the occupant or has been uttered from the notification object.

13. The in-vehicle monitoring device according to claim 1, wherein
the processing circuitry acquires, from the sensor or a vehicle control device mounted on the vehicle, boarding information on whether the occupant or the notification object gets in the vehicle or whether the occupant or the notification object gets out of the vehicle, and
acquires the boarding information, and determines whether the notification object is left behind in the vehicle using the detection results if the occupant or the notification object gets in the vehicle or gets out of the vehicle.

14. The in-vehicle monitoring device according to claim 1, wherein
the processing circuitry acquires, from the sensor or a vehicle control device mounted on the vehicle, boarding information on whether the occupant or the notification object gets in the vehicle, or whether the occupant or the notification object gets out of the vehicle, and
the processing circuitry acquires the boarding information, and if the notification object gets in the vehicle or the occupant gets out of the vehicle, the processing circuitry determines whether the notification object is left behind in the vehicle, using the detection results.

15. The in-vehicle monitoring device according to claim 1, wherein
the processing circuitry determines whether ride of the occupant or the notification object in the vehicle is a first ride, on the basis of stop time indicating a period in which the vehicle has been standing.

16. The in-vehicle monitoring device according to claim 1, wherein
in a case where the processing circuitry determines that the occupant and the notification object are not in the vehicle, and a door of the vehicle is opened, the door of the vehicle is unlocked, or the vehicle is remotely started, the processing circuitry determines that ride of the occupant or the notification object in the vehicle is a first ride.

17. An in-vehicle monitoring system comprising:
a sensor mounted on a vehicle and adapted to detect any object in the vehicle; and
processing circuitry
to acquire in-vehicle information indicating a situation in the vehicle from the sensor,
to detect an occupant as the any object in the vehicle using the acquired in-vehicle information,
to detect a notification object as the any object in the vehicle using the acquired in-vehicle information-,
to determine whether ride of the occupant or the notification object in the vehicle is a first ride,
to determine whether the notification object is left behind in the vehicle using detection results,
in a case where the processing circuitry determines that the notification object is left behind,
in a case where the processing circuitry determines that the ride is not a first ride, to determine that notification is necessary if a set first condition is satisfied-in-a-case
in a case where the processing circuitry determines that the ride is a first ride, to determine necessity of notification using a second condition that is satisfied, wherein the second condition is relaxed as compared with the first condition, and
in a case where the processing circuitry determines necessity of the notification, to control a device of the vehicle, wherein
the processing circuitry determines whether the ride of the occupant or the notification object in the vehicle is a first ride, based on whether the occupant or the notification object enters the vehicle in a state in which both the occupant and the notification object are not present in the vehicle.

18. The in-vehicle monitoring system according to claim 17, wherein
the sensor includes: an imaging device to be mounted on the vehicle and to acquire an image obtained by imaging an inside of the vehicle; and a radio wave sensor to be mounted on the vehicle and to acquire distance data obtained by measuring a distance to an object in the vehicle,
the processing circuitry acquires the image obtained from the imaging device and the distance data obtained from the radio wave sensor as the in-vehicle information,
the processing circuitry detects the occupant in the vehicle using at least one of the image and the distance data, and
the processing circuitry detects the notification object in the vehicle using at least one of the image and the distance data.

19. An in-vehicle monitoring method comprising:
acquiring in-vehicle information indicating a situation in a vehicle from a sensor that detects any object in the vehicle;
detecting an occupant as the any object in the vehicle using the acquired in-vehicle information;
detecting a notification object as the any object in the vehicle using the acquired in-vehicle information;
determining whether ride of the occupant or the notification object in the vehicle is a first ride;
determining whether the notification object is left behind in the vehicle using detection results;
in a case of determining that the notification object is left behind,
in a case of determining that the ride is not a first ride, determining that notification is necessary if a set first condition is satisfied, and
in a case where it is determined that the ride is a first ride, determining that notification is necessary using a second condition that is satisfied, wherein the second condition is relaxed as compared with the first condition, and
in a case of determining necessity of the notification, controlling a device of the vehicle, wherein
the method further comprises determining whether the ride of the occupant or the notification object in the vehicle is a first ride, based on whether the occupant or the notification object enters the vehicle in a state in which both the occupant and the notification object are not present in the vehicle.

* * * * *